(12) United States Patent
Irie et al.

(10) Patent No.: US 9,286,519 B2
(45) Date of Patent: Mar. 15, 2016

(54) WHITE TURBID STATE DIAGNOSTIC APPARATUS

(71) Applicant: CLARION CO., LTD., Saitama (JP)

(72) Inventors: Kota Irie, Saitama (JP); Shoji Muramatsu, Tokyo (JP); Shunsuke Kondou, Yokohama (JP); Masahiro Kiyohara, Tokyo (JP)

(73) Assignee: Clarion Co. Ltd., Saitama (JP)

( * ) Notice: Subject to any disclaimer, the term of this patent is extended or adjusted under 35 U.S.C. 154(b) by 301 days.

(21) Appl. No.: 13/928,001

(22) Filed: Jun. 26, 2013

(65) Prior Publication Data

US 2014/0002654 A1    Jan. 2, 2014

(30) Foreign Application Priority Data

Jun. 27, 2012    (JP) .................................. 2012-143739

(51) Int. Cl.
*G06K 9/00* (2006.01)
*G06T 7/00* (2006.01)

(52) U.S. Cl.
CPC .......... *G06K 9/00791* (2013.01); *G06T 7/0002* (2013.01); *G06T 2207/30252* (2013.01)

(58) Field of Classification Search
CPC ........................... H04N 7/185; H04N 5/23206
USPC ........................................................ 348/148
See application file for complete search history.

(56) References Cited

U.S. PATENT DOCUMENTS 6,120,446 A * 9/2000 Ji .......................... G01N 29/221
600/437
2006/0115121 A1    6/2006 Saka et al.
2007/0115357 A1    5/2007 Stein et al.
2008/0176276 A1 *  7/2008 Arai .................... G01N 33/5005
435/40.5
2009/0303356 A1 * 12/2009 Min ..................... H04N 5/3591
348/241
2012/0033872 A1 *  2/2012 Cho ....................... G06T 15/205
382/154

FOREIGN PATENT DOCUMENTS

DE    10322087 A1    12/2004
EP     1988389 A1    11/2008
(Continued)

OTHER PUBLICATIONS

Franklin, Hugh (Website: Megalithic Yard Unearthed, Arcs, chords & Sagitta, http://hew_frank.tripod.com/id34.htm, last update Feb. 2006).*

(Continued)

*Primary Examiner* — Jamie Atala
*Assistant Examiner* — Ayman Abaza
(74) *Attorney, Agent, or Firm* — Studebaker & Brackett PC

(57) ABSTRACT

A white turbid state diagnostic apparatus has an imaging part installed on a vehicle and configured to convert a light signal from a periphery of the vehicle into an image signal, a region detection part configured to detect a region from the image signal, the region being constituted by pixels having brightness values over a predetermined brightness and being in a substantially circular shape having a predetermined area or more, a brightness gradient calculation part configured to calculate a brightness gradient on a line which is directed from a predetermined position in a predetermined direction based on brightness values of pixels on the line in the region, and a white turbid level calculation part configured to calculate a white turbid level of the lens based on the brightness gradient.

12 Claims, 15 Drawing Sheets

(56) References Cited

FOREIGN PATENT DOCUMENTS

| JP | 2003-259358 A | | 9/2003 | |
|----|----|----|----|----|
| WO | 2010/038223 A1 | | 4/2010 | |
| WO | WO 2010038223 | * | 4/2010 | ................ B60R 1/00 |
| WO | WO 2011022783 | * | 8/2010 | ............... A61B 3/12 |

OTHER PUBLICATIONS

The extended European search report issued on Oct. 8, 2013, which corresponds to EP13173727.2 and is related to U.S. Appl. No. 13/928,001.

* cited by examiner

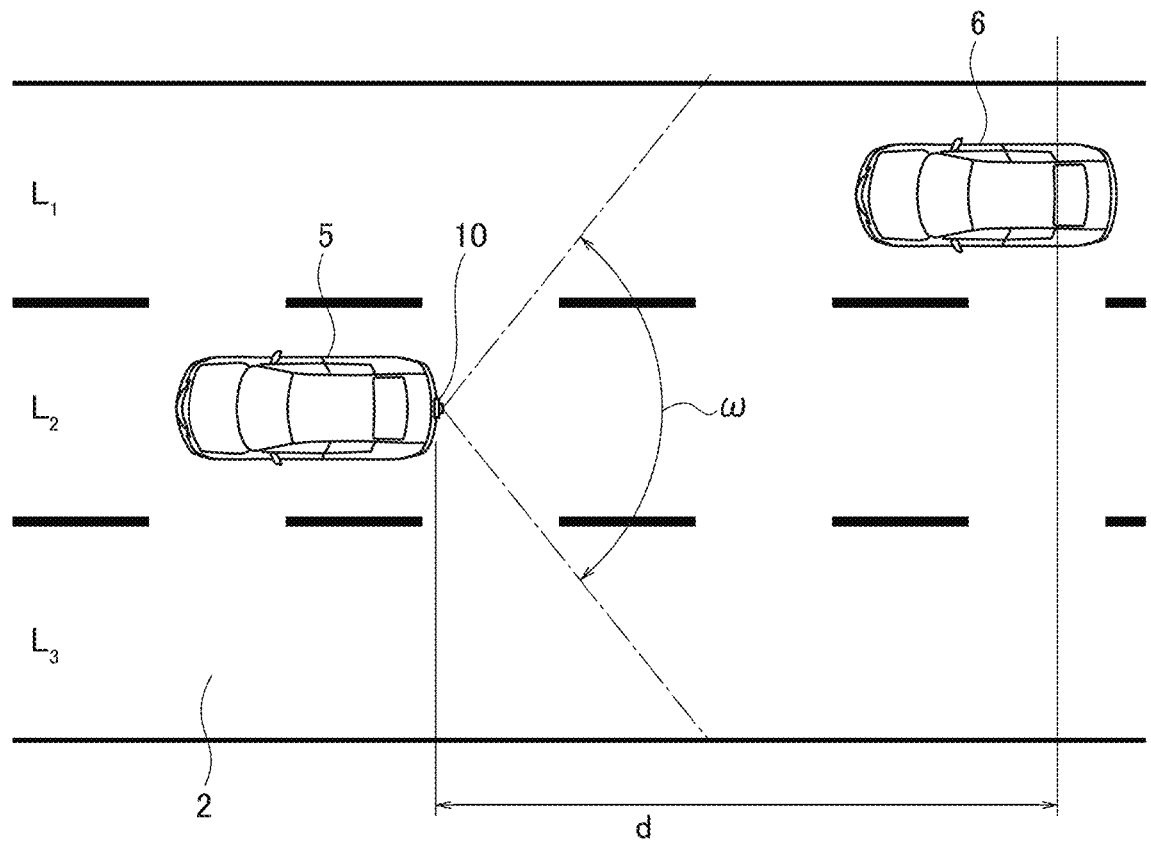

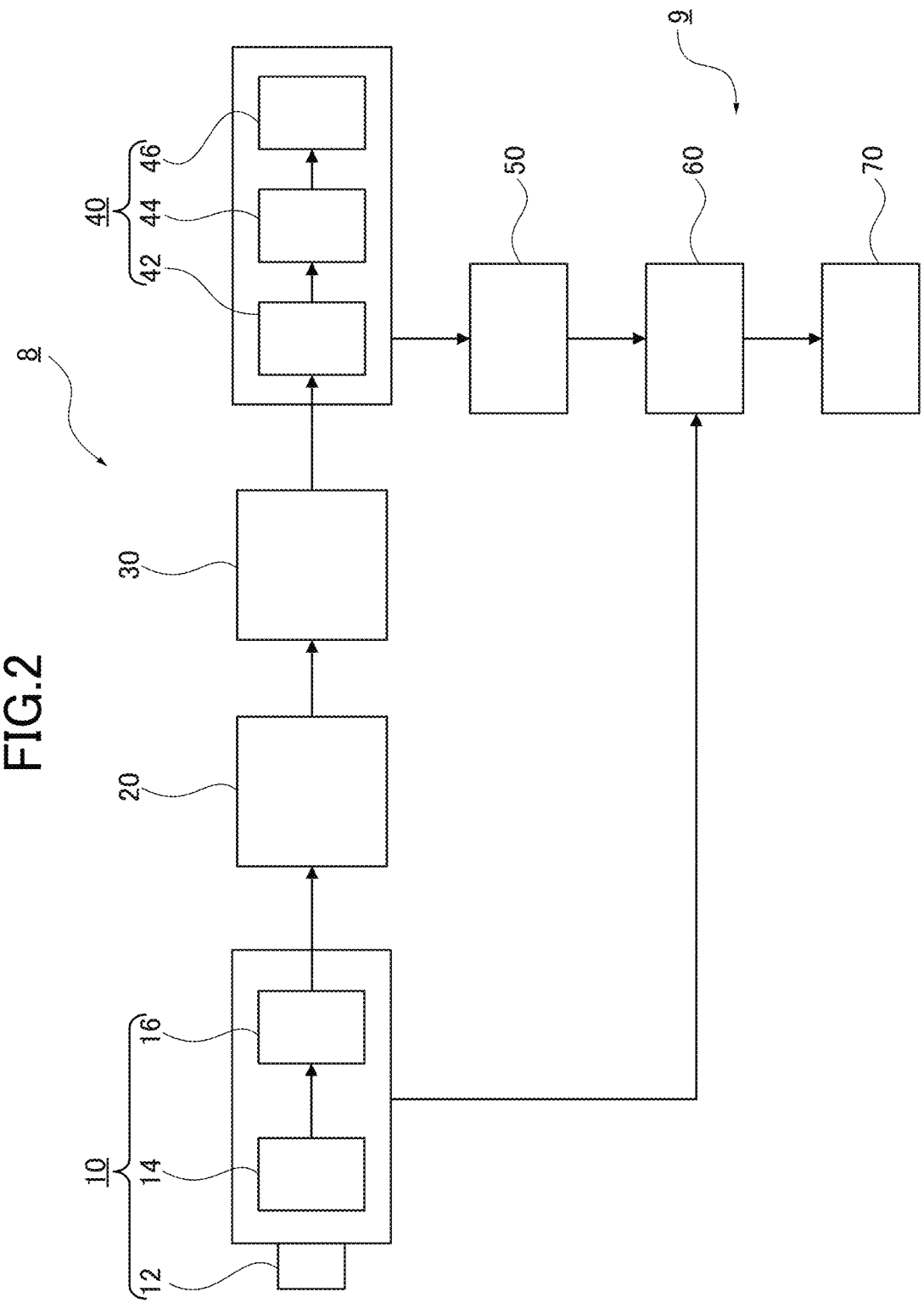

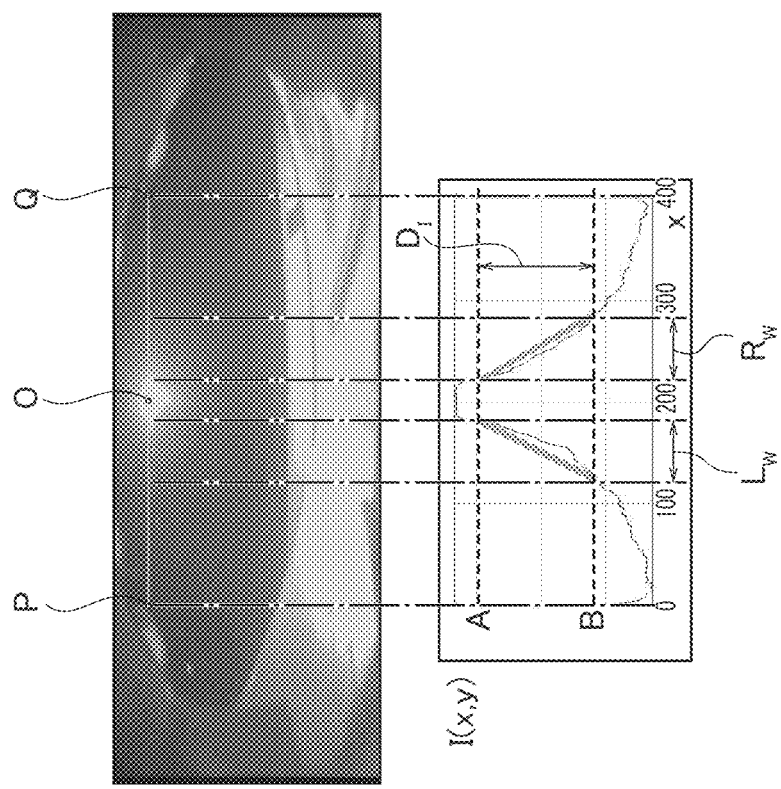
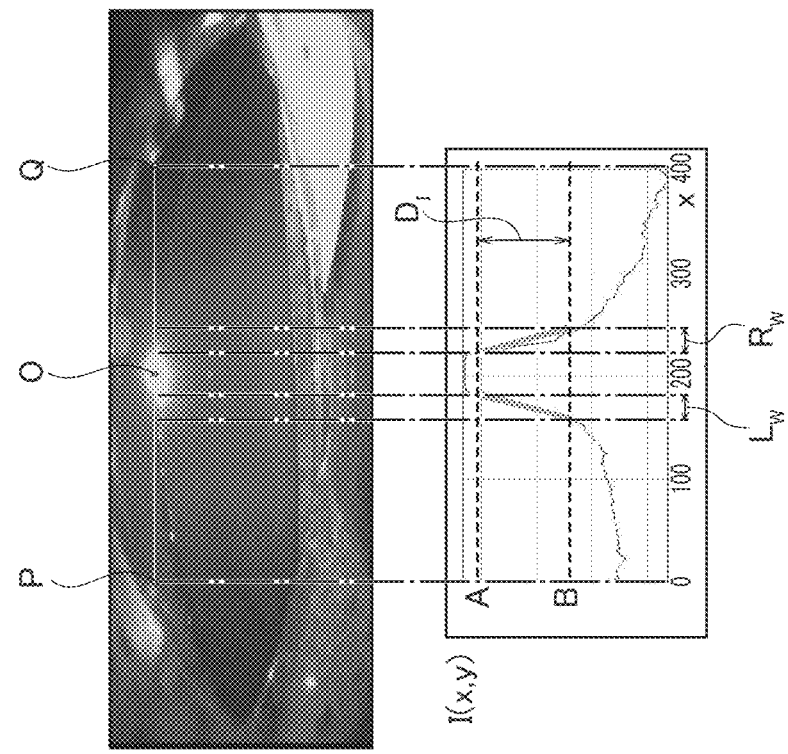

WHITE TURBID STATE DIAGNOSTIC APPARATUS

CROSS REFERENCE TO RELATED APPLICATION

The present application claims priority to Japanese Patent Application No. 2012-143739 filed Jun. 27, 2012 to the Japan Patent Office, the entire content of which is incorporated herein by reference in its entirety.

BACKGROUND OF THE INVENTION

1. Field of the Invention

The present invention relates to a lens white-turbid state diagnostic apparatus for diagnosing a white turbid state of a lens of a camera, which is caused by impurities deposited by drying out water attached to a surface of the lens.

2. Description of the Related Art

Recently, for a vehicle such as an automobile, vehicle periphery recognition systems have been in practical uses. In such a vehicle periphery recognition system, a camera is installed on a vehicle to image a periphery of the vehicle and the system detects a position of another vehicle, a position of a lane marker, or a position of a driving lane from an obtained image, and judges a possibility of contact with the another vehicle or a possibility of a lane departure to alert a driver.

In such a system, for example, while driving in the rain, water splashed by the vehicle can be attached to a lens surface of the camera. Also, while driving on a dirt road, dust stirred up by the vehicle can be attached to the lens surface of the camera. Further, while driving on a road where a snow-melting agent is spread, the snow-melting agent splashed by the vehicle can be attached to the lens surface of the camera. Those substances attached as described above are dried, and impurities in water, dust, or snow-melting agent are deposited and piled up on the lens surface to cause grime (hereinafter, white turbidity) on the lens surface.

When a white turbid part is generated on the lens surface, light entering the lens is scattered at the white turbid part and therefore blur or bleed occurs in the observed image. Since images of other cars or lane markers to be detected are deformed because of the blur or bleed, detection failure (no detection) of the other cars or lane markers or detection of non-existing other car or lane marker (false detection) occurs. Due to the occurrence of the detection failure or false detection, an appropriate alert to the driver may not be provided.

In a system where crews in the vehicle cannot visibly recognize the image obtained by the camera, the crews cannot confirm that the lens has a white-turbid part, and therefore the above detection failure or false detection gives the crew with a sense of uncertainty to the system.

A method as a technology for detecting a grime on a lens is disclosed (see, for example, Japanese Patent Application Publication 2003-259358), in which a plurality of images are photographed at different timings, differences between the plurality of images are accumulated, and a region having a gray value (an accumulated value of the differences) which is a predetermined value or less and having an area which is a predetermined area value or more is detected as a grime on the lens.

In a grime detection device disclosed in Japanese Patent Application Publication 2003-259358, the grime on the lens is detected based on the differences in the plurality of images photographed at different timings. In detection, the region is detected, where the accumulated value of the differences is the predetermined value or less, and the area is the predetermined area value or more.

However, in the grime detection device disclosed in Japanese Patent Application Publication 2003-259358, in a plurality of images photographed at different timings, a region having small variation in gray values, such as a region of a dirt road or a uniform asphalt pavement surface in addition to a grime can be detected as a grime and therefore it is difficult to steadily detect only a grime on a lens.

SUMMARY OF THE INVENTION

An embodiment of the present invention is to provide a steady diagnosis of a white-turbid state by steadily detecting a grime on a lens due to white turbidity.

A white turbid state diagnostic apparatus according to an embodiment of the present invention diagnoses a white turbid state due to impurities deposited by drying water, dust, snow-melting agent, or the like attached to a lens surface of a camera based on a brightness gradient which is a gradient of gray values in an image photographed by an imaging part.

More specifically, a white turbid state diagnostic apparatus according to an embodiment of the present invention, includes an imaging part installed on a vehicle and configured to observe a periphery of a vehicle via a lens, the imaging part having a photoelectric conversion section configured to convert a light signal of the observed periphery of the vehicle into an image signal; a region detection part configured to detect a region from the image signal, the region being constituted by pixels having brightness values over a predetermined brightness and being in a substantially circular shape having a predetermined area or more; a brightness gradient calculation part a brightness gradient on a line which is directed from a predetermined position in a predetermined direction based on brightness values of pixels on the line in the region; and a white turbid level calculation part a white turbid level of the lens based on the brightness gradient.

According to a white turbid state diagnostic apparatus of an embodiment of the present invention, in the imaging part installed in the vehicle and configured to image the periphery of the vehicle, the light signal transmitting the lens is converted into the image signal. The region detection part detects the region from the image signal obtained by the conversion such that the region has the brightness values over the predetermined brightness and is in a substantially circular shape having the area having the predetermined area or more.

The brightness gradient calculation part sets the line directed in the predetermined direction from the predetermined position in the detected region and reads the brightness values on the pixels on the set line to calculate the brightness gradient on the line.

The white turbid level calculation part calculates the white turbid level of the lens based on the brightness gradient calculated in the brightness gradient calculation part. Thereby, by focusing only on the predetermined line in the region constituted by pixels having high brightness values, the brightness gradient varying according to the white turbid level of the lens can be steadily detected. Thus, the white turbid level can be certainly diagnosed.

BRIEF DESCRIPTION OF DRAWINGS

FIG. 1 is a view explaining a blind spot warning (BSW) system as an example of an on-vehicle system where a white turbid state diagnostic apparatus according to Embodiment 1 is installed.

FIG. 2 is a block diagram schematically showing the white turbid state diagnostic apparatus according to Embodiment 1.

FIGS. 3A and 3B are views explaining a situation where a white turbidity on a lens occurs: FIG. 3A showing an example of an image imaged in a condition without white turbidity and an example of brightness distribution in the image, and FIG. 3B showing an example of an image imaged in a condition with white turbidity and an example of brightness distribution in the image.

FIG. 7A showing an imaged image, FIG. 7B showing an image obtained by minifying the imaged image, FIG. 7C showing an image obtained by binarizing the image shown in FIG. 7B, and FIG. 7D showing a resulting region extracted from the image shown in FIG. 7C and satisfying conditions.

FIG. 8A showing an example of a shape to be detected, and FIG. 8B showing examples of shapes not to be detected.

FIG. 17A showing an example where two lines having a bilaterally symmetric relationship and obliquely upwardly extending are set, FIG. 17B showing an example where a single horizontal line extending leftward is set, FIG. 17C showing an example where a single vertical line upwardly extending is set, FIG. 17D showing an example where two lines having a bilaterally symmetric relationship and obliquely upwardly extending and two horizontal lines extending leftward and rightward are set, and FIG. 17E showing an example where two rectangular regions extending horizontally are set.

MODE FOR CARRYING OUT THE INVENTION

Figure 4:
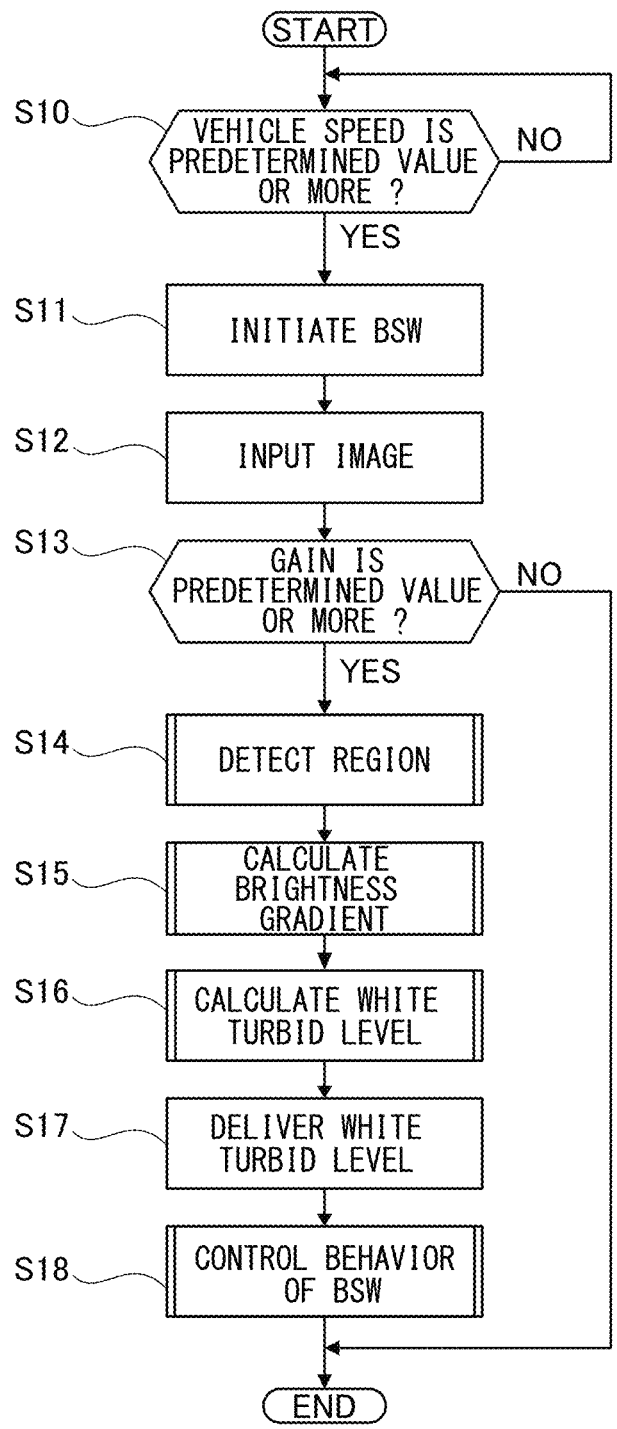
FIG. 4 is a flowchart of a main routine performing a diagnosis of a lens white turbid state in the white turbid state diagnostic apparatus according to Embodiment 1.

Hereinafter, embodiments of a white turbid state diagnostic apparatus according to the present invention will be explained with reference to drawings. In the following explanation, a gray value stored in an image is referred to as a brightness value.

Embodiment 1

This embodiment is an example where a white turbid state diagnostic apparatus according to the present invention is applied to a vehicle having a BSW system which performs a backward monitoring of the vehicle while driving and performs alerting or warning when there is an approaching vehicle in an adjacent lane at a backward position of the vehicle.

First, operations of the BSW system will be explained with reference to FIG. 1. The BSW system 9 is installed on a rear part of a vehicle 5 in a backward direction. An imaging part 10 is installed to image a range ω including adjacent right and left lanes in a backward position of the vehicle 5 (a range including lanes $L_1$, $L_2$, and $L_3$ of a road 2) to obtain an image. The BSW system 9 detects an approaching vehicle existing in the lanes ($L_1$, $L_3$) adjacent to the lane where the vehicle 5 is running from the image obtained by the imaging part 10.

More specifically, the BSW system 9 is initiated when the vehicle 5 is running at a predetermined speed or more, and detects another vehicle in the lanes ($L_1$, $L_3$) adjacent to the lane $L_2$ where the vehicle 5 is running within a range of a distance d from the imaging part 10. When it is confirmed that the detected another vehicle is approaching to the vehicle 5, the another vehicle is detected as an approaching vehicle.

In case of FIG. 1, a vehicle 6 existing in the lane $L_1$ is detected. It is judged that the vehicle 6 is approaching by recognizing that the vehicle detected from the obtained image becomes larger over time.

It is notified to a driver as visible information, for example, by lighting of an indicator or the like provided in the vehicle 5, that there exists the vehicle 6 approaching to the vehicle 5 in the lane $L_1$ (first alarm).

When the driver does not notice the visible information and tries to change a lane while putting on a direction indicator toward the lane $L_1$ where the vehicle 6 exists, the existence of the vehicle 6 is more clearly notified to the driver by flashing the indicator and making an alarm sound to encourage to stop changing the lane (second alarm).

Next, configurations of the white turbid state diagnostic apparatus according to Embodiment 1 will be explained with reference to FIG. 2. FIG. 2 shows an example where the white turbid state diagnostic apparatus according to the present embodiment is applied to the above-described BSW system.

As shown in FIG. 2, the white turbid state diagnostic apparatus 8 according to Embodiment 1 is installed near a rear license plate of the vehicle 5 (shown in FIG. 1). The white turbid state diagnostic apparatus 8 includes the imaging part 10 observing the range ω shown in FIG. 1, a region detection part 20 to detect an image of a headlight of a following vehicle from the image obtained by the imaging part 10, a brightness gradient calculation part 30 to calculate a brightness gradient on a predetermined line in a region detected by the region detection part 20, a white turbid level calculation part 40 to calculate a white turbid level of a lens 12 based on the brightness gradient calculated by the brightness gradient calculation part 30, and a white turbid level delivering part 50 to deliver the white turbid level calculated by the white turbid level calculation part 40 to a later-described approaching vehicle detection section 60.

The white turbid level calculation part 40 has a brightness gradient average calculation section 42 to calculate an average value of brightness gradients on a plurality of predetermined lines, a similarity calculation section 44 to judge whether or not regions detected by the region detection part 20 at different times are images formed from the same light source, and a certainty determination section 46 to determine certainty of the calculated white turbid level.

The white turbid state diagnostic apparatus 8 according to Embodiment 1 cooperates with the BSW system 9 having the approaching vehicle detection section 60 to detect an approaching vehicle from the image obtained by the imaging part 10 and an alert output section 70 to alert by an indicator or a buzzer when the approaching vehicle is detected by the approaching vehicle detection section 60.

A diagnosis method in the white turbid state diagnostic apparatus 8 according to Embodiment 1 will be explained with reference to FIGS. 3A and 3B.

In the white turbid state diagnostic apparatus 8 according to Embodiment 1, by use of an image of a headlight of a following vehicle running in the same lane $L_2$ as the vehicle 5, obtained by the imaging part 10, a lens white turbid state is diagnosed based on the brightness gradients on the predetermined lines in the image of the headlight.

This is because the image of a strong light source such as the headlight is scattered by the white turbidity of the lens, a bright region of the image expands variously according to a white turbid level of the lens, and as the white turbid level is higher, the bright region is observed as a more widely expanding image. Since the headlight is strong, high SN image signals can be obtained. Thereby, the brightness gradient changes more largely and certainty of the diagnosis is improved.

According to this method, the diagnosis of the white turbid state of the lens 12 can be performed only at nighttime where the image of the headlight is observed. However, since strong light source such as the headlight barely directly enters the imaging part 10 at daytime, the operations of the BSW system 9 do not have any problem even if the lens 12 has some white turbidity.

Each of FIGS. 3A and 3B shows an image I (x, y) actually observed by the imaging part 10 of the white turbid state diagnostic apparatus 8, and including the headlight of the following vehicle running in the same lane as the vehicle 5. FIG. 3A shows an image in case where the lens 12 does not have white turbidity and FIG. 3B shows an image in case where the lens 12 has white turbidity.

Graphs shown below the images of FIGS. 3A, 3B each show distribution of brightness values (hereinafter, brightness distribution) in a scanning direction (line) OP extending leftward from a scanning start point O in the image of the headlight as a start point and brightness distribution in a scanning direction (line) OQ extending rightward from the scanning start point O in the image of the headlight as a start point, shown within one graphs.

In FIG. 3A, it is set that a left-right or horizontal direction pixel number from a point where the brightness distribution on the scanning direction OP goes down under a threshold value A (first threshold value) to a point where the brightness distribution goes down under a threshold value B (second threshold value) which is lower than the threshold value A is referred to as $L_w$, and a left-right direction pixel number from a point the brightness distribution on the scanning direction OQ goes down under the threshold value A to a point where the brightness distribution goes down under the threshold value B which is lower than the threshold value A is referred to as $R_w$. Then, the brightness gradient g is calculated by using brightness difference $D_I$ (=A−B) as $D_I/L_w$ (brightness gradient on the scanning direction OP) and $-D_I/R_w$ (brightness gradient on the scanning direction OQ). In case of FIG. 3A where the lens 12 does not have white turbidity, an absolute value of the brightness gradient g is a large value and the brightness distribution has small dispersion and is sharpened.

On the other hand, in case of FIG. 3B, an absolute value of the brightness gradient g is a small value and the brightness distribution is broadened.

The lens white turbid state diagnostic apparatus 8 according to Embodiment 1 diagnoses the lens white turbid state by use of magnitude of the brightness gradient g. That is, as the absolute value of the brightness gradient g is smaller, the lens white turbid state is diagnosed as a higher white turbid level. As described in detail later, in embodiments of the present invention, in order to improve certainty of the white turbid state diagnosis, it is judged that the white turbidity occurs when a state of low brightness gradient g is maintained for a certain period.

Next, a flow of the lens white turbid state diagnosis in the white turbid state diagnostic apparatus 8 according to Embodiment 1 will be explained with reference to FIG. 4.

FIG. 4 shows a flowchart of a main routine performing a lens white turbid state diagnosis in the white turbid state diagnostic apparatus 8 according to Embodiment 1.

In step S10, a vehicle speed of the vehicle 5 is detected in the approaching vehicle detection section 60. When the vehicle speed is, for example, 30 km/hour or more, the process moves to step S11 to initiate the BSW system 9. On the other hand, when the vehicle speed is less than 30 km/hour, the process repeats step S10.

In step S12, an image of a backward of the vehicle 5 is obtained by the imaging part 10. A light signal transmitting the lens 12 is converted into an electric signal in a photoelectric conversion section 14 configured by a CMOS element, and the electric signal is amplified in a gain adjustment section 16 to generate an image signal I (x, y). Hereinafter, the image signal I (x, y) is simply referred to as the image I (x, y).

The gain adjustment section 16 confirms a level of the electric signal obtained by conversion in the photoelectric conversion section 14, provides an appropriate gain to amplify the electric signal so as to have a predetermined level to generate the image I (x, y). Thereby, even when the image is obtained under a dark environment, due to the appropriate gain, the image I (x, y) having a high SN ratio can be obtained. The gain adjustment is performed as needed together with imaging, and in the gain adjustment section 16, the latest gain value can be monitored.

In step S13, it is judged whether or not a value of the gain is a predetermined value or more. If it is judged that the gain value is the predetermined value or more, that is, it is judged that the image I (x, y) is obtained at nighttime, the process moves to step S14. If not, it is judged that the image I (x, y) is obtained at daytime and the lens white turbid state diagnosis is not performed and only the BSW system 9 is set to be operated.

Figure 5:
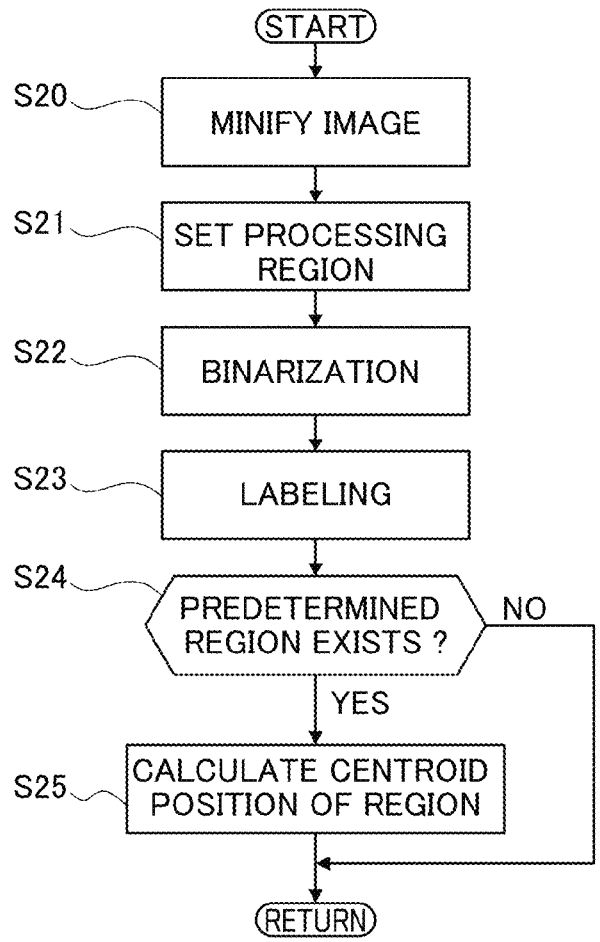
FIG. 5 is a flowchart of a region detection processing performed in a region detection part of the white turbid state diagnostic apparatus according to Embodiment 1.

Next, in step S14, in the region detection part 20, a region of an image of a headlight of a following vehicle running in the same lane $L_2$ as the vehicle 5 is detected from the obtained image I (x, y). The processes are shown in FIG. 5 and detailed explanation will be described later.

Figure 9:
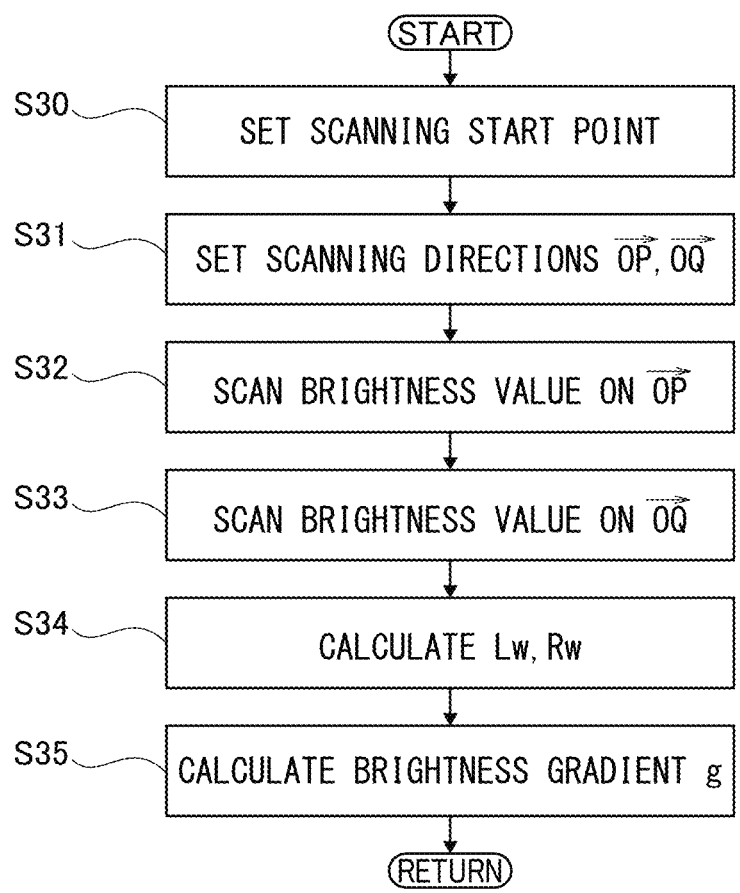
FIG. 9 is a flowchart of a brightness gradient calculation processing performed in a brightness gradient calculation part in the white turbid state diagnostic apparatus according to Embodiment 1.

In step S15, in the brightness gradient calculation part 30, a brightness gradient within the region of the image of the headlight detected in step S14 is calculated. The processing is shown in FIG. 9 and detailed explanation will be described later.

Figure 11:
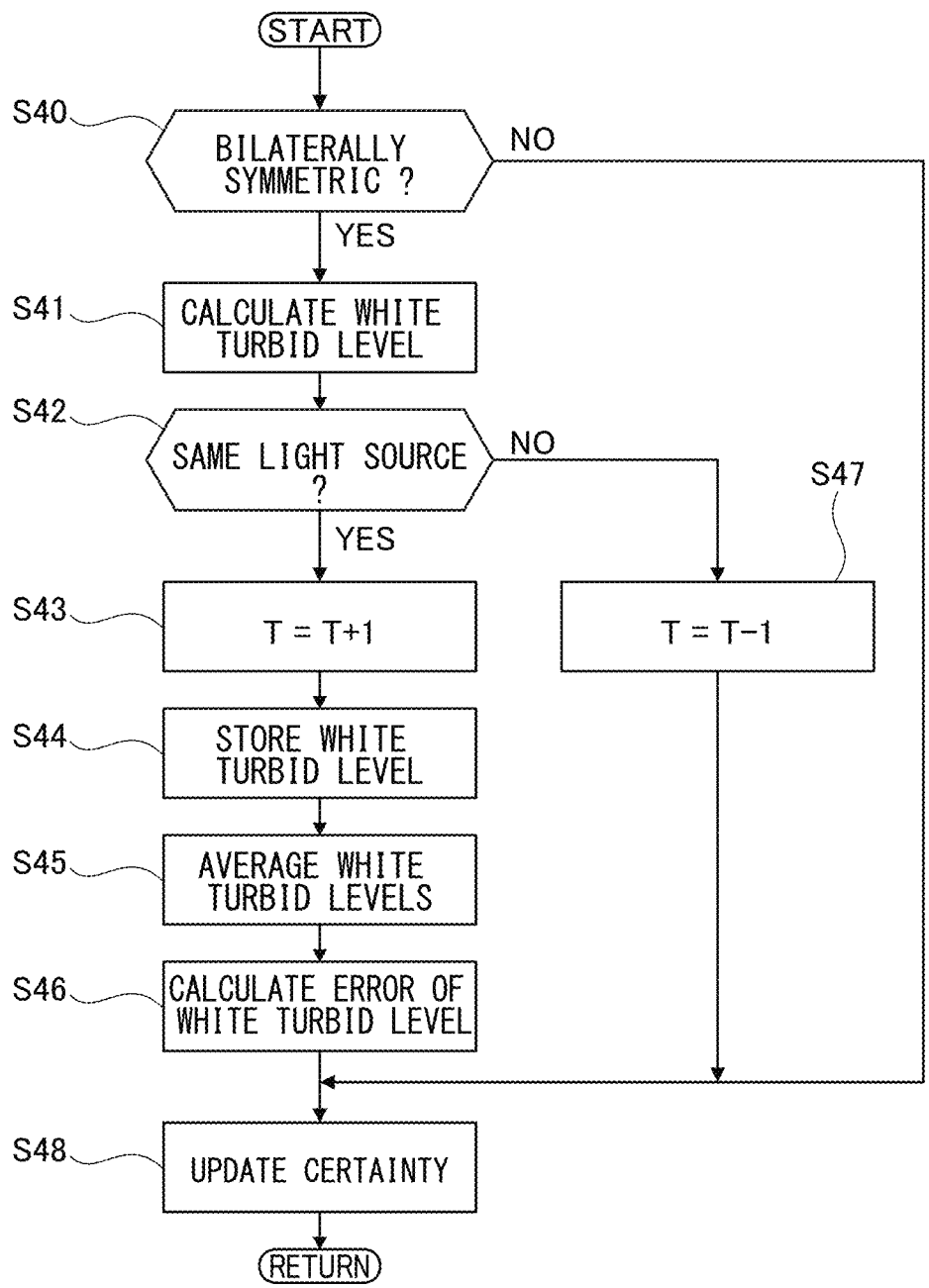
FIG. 11 is a flowchart of processing to calculate a white turbid level performed in a white turbid level calculation part in the white turbid state diagnostic apparatus according to Embodiment 1.

In step S16, in the white turbid level calculation part 40, a white turbid level of the lens 12 is calculated based on the brightness gradient calculated in step S15. The processing is shown in FIG. 11 and detailed explanation will be described later.

In step S17, parameters such as a white turbid level U of the lens 12 calculated in step S16 are delivered to the approaching vehicle detection section 60 through the white turbid level delivering part 50.

Figure 13:
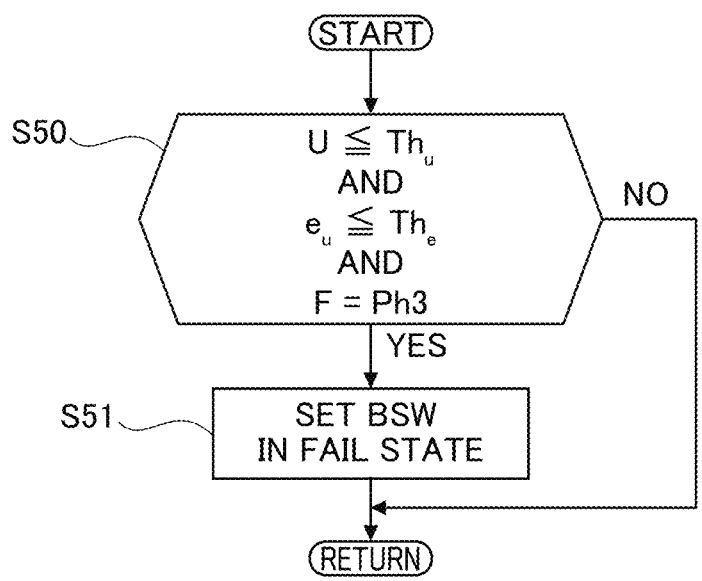
FIG. 13 is a flowchart showing a flow of processing after a diagnosis of the white turbid state in the white turbid state diagnostic apparatus according to Embodiment 1.

In step S18, the approaching vehicle detection section 60 switches appropriately behaviors of the BSW system 9 according to the delivered white turbid level of the lens 12, or the like. The processing is shown in FIG. 13 and detailed explanation will be described later.

Next, the region detection processing in step S14 shown in FIG. 4 will be explained in detail with reference to a flowchart of FIG. 5 and an image of FIGS. 7A to 7D.

In step S20 of FIG. 5, the image I (x, y) obtained by the imaging part is minified, for example, into a scale having ¼ in a vertical direction and ⅛ in a horizontal direction to generate a minified image I' (x, y).

The image is minified as described above to reduce a required memory upon image processing and to improve a processing speed. A specific scale is determined in view of used computer specifications and image resolution capable of diagnosing white turbid levels, and therefore is not limited to the above-described value.

Figure 7A:
FIGS. 7A to 7D are views showing an example of the region detection processing in the white turbid state diagnostic apparatus according to Embodiment 1.
Figure 7B:
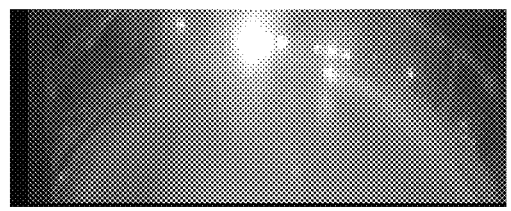

The diminution of the image is performed by thinning pixels and can be performed by averaging brightness values of adjacent pixels. Due to the processing, the image shown in FIG. 7A is minified to the image shown in FIG. 7B.

In step S21, a region including the image of the headlight of the following vehicle running in the same lane $L_2$ as the vehicle 5 is set in the minified image I'(x, y) obtained in step S20. This is because a position of the headlight of the following vehicle can be previously expected and the following processings can be effectively performed.

Figure 6:
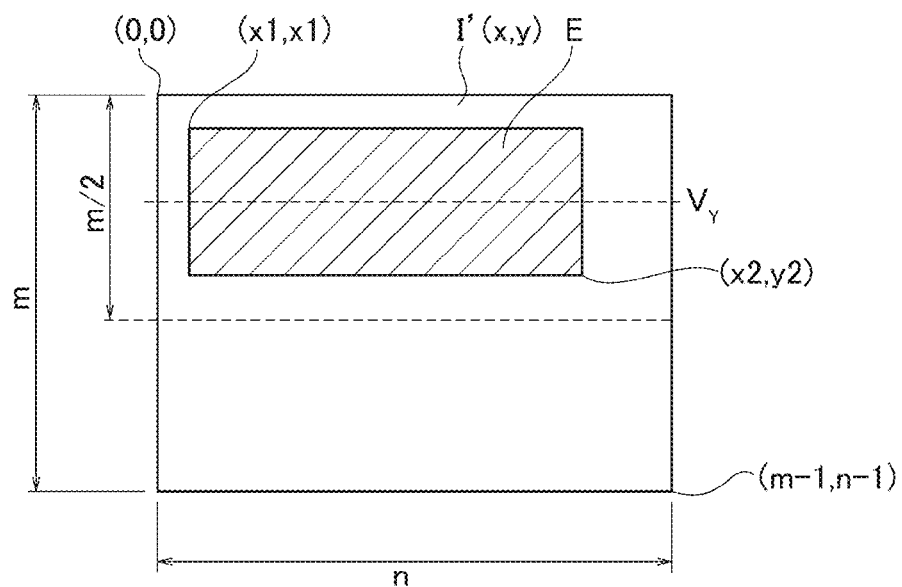
FIG. 6 is a view explaining a range to perform the region detection processing performed in the white turbid state diagnostic apparatus according to Embodiment 1.

FIG. 6 shows a schematic view of the processing area set in this step. As shown in FIG. 6, the processing area E is set with an upper left position set as (x1, y1) and a lower right position set as (x2, y2) with respect to an image having m pixels in a horizontal direction and n pixels in a vertical direction.

A vertical position of the processing area E is set based on a position of a vertical coordinate $V_Y$ (see FIG. 6) of a disappearing point defined by an installed position of the imaging part 10 to the vehicle 5.

A horizontal position of the processing area E is set according to the installed position of the imaging part 10 to the vehicle 5. That is, when the imaging part 10 is set at a center of the vehicle 5, the processing area E is set in the minified image I'(x, y) in a symmetrical manner in the horizontal direction. In case of FIG. 6, the installed position of the imaging part 10 to the vehicle 5 is offset and therefore the processing area E is set in a symmetrical manner in the horizontal direction. By setting the processing area E as described above, it is not necessary to process an entire area of the minified image I'(x, y), and therefore processing efficiency is improved.

Figure 7C:
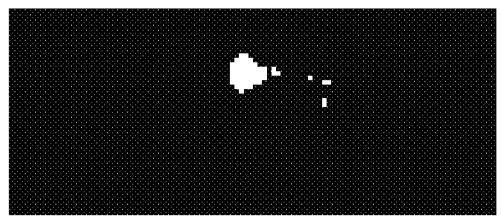

In step S22 of FIG. 5, the minified image I'(x, y) is binarized with a predetermined threshold value in the processing area E set in step S21. As the predetermined threshold value, a value with which the image of the headlight of the following vehicle running in the same lane $L_2$ as the vehicle 5 can be detected is previously obtained based on experiments or the like and stored in the region detection part 20. By the binarizing processing, the binarized image shown in FIG. 7C is obtained.

In step S23 of FIG. 5, a labeling processing is performed with respect to the binarized image generated in step S22. The labeling processing is a processing provided for a binarized image, and to number each region constituting the binarized image.

Next, in step S24 of FIG. 5, it is judged whether or not there exists an image of a headlight in the image where the labeling processing is performed in step S23. The processing performed in this step will be explained with reference to FIGS. 8A and 8B.

Figure 8A:
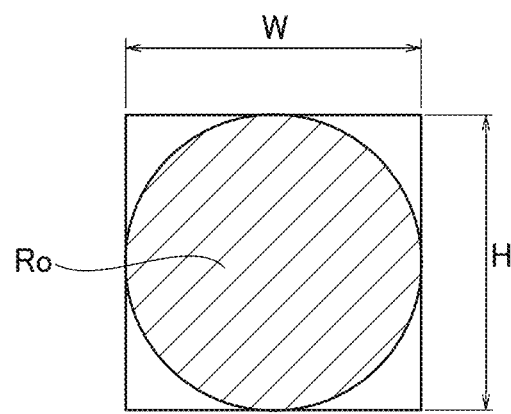
FIGS. 8A and 8B are views explaining shapes of a region detected in the region detection part of the white turbid state diagnostic apparatus according to Embodiment 1.

The image of the headlight of the following vehicle running in the same lane $L_2$ as the vehicle 5, which is imaged by the imaging part 10 has a substantially circular shape shown as a region $R_0$ in FIG. 8A. Accordingly, with respect to each region where the labeling processing is performed, when an area HW of a rectangular region (vertical pixel number H, horizontal pixel number W) is circumscribed to the region, it is judged that an area of the region occupies a predetermined ratio or more within the area HW and that a width and a height of the square circumscribed to the region are not different from each other at a predetermined ratio or more.

Criteria for judgment of the area is expressed by equation (1) and criteria for judgment of the width and the height of the circumscribed square is expressed by equation (2).

$$S > HW \times Th_S \quad (1)$$

$$W < H \times Th_W \text{ and } H < W \times Th_H \quad (2)$$

Here, S is an area of the region, $Th_S$ is a threshold value ($Th_S < 1$) of an area occupancy with respect to the square region, $Th_W$ is a threshold value ($Th_W > 1$) restricting a horizontal length of the square region, and $Th_H$ is a threshold value ($Th_H > 1$) restricting a vertical length of the square region.

Figure 8B:
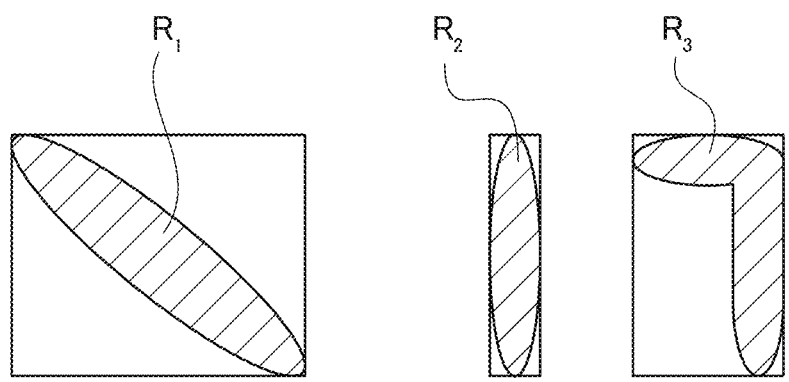

According to the judgments, for example, a region having a shape such as a region $R_1$, $R_2$, or $R_3$ shown in FIG. 8B is judged as not being an image of the headlight and dismissed.

Figure 7D:
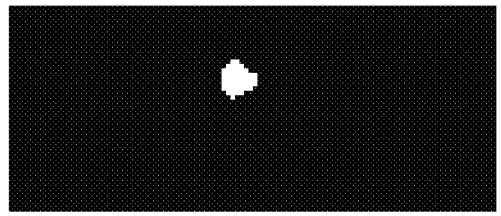

According to the judgments, as shown in FIG. 7D, one region satisfying the conditions is selected. When a plurality of regions satisfying the conditions are found, one region which has the largest area is selected. When no region satisfying the conditions is found (if step S24 is NO), the process returns to the main routine (FIG. 4).

In step S25, a centroid position G of the region selected in step S24 is calculated. When a coordinate of the centroid position G of the region is set as G (Gx, Gy), a horizontal position Gx of the centroid position G is calculated by dividing a sum of horizontal coordinates of all pixels forming the region by the area of the region, and a vertical position Gy of the centroid position G is calculated by dividing a sum of vertical coordinates of the all pixels forming the region by the area of the region. Then, the processing in FIG. 5 is terminated and the process returns to the main routine (FIG. 4).

Figure 10:
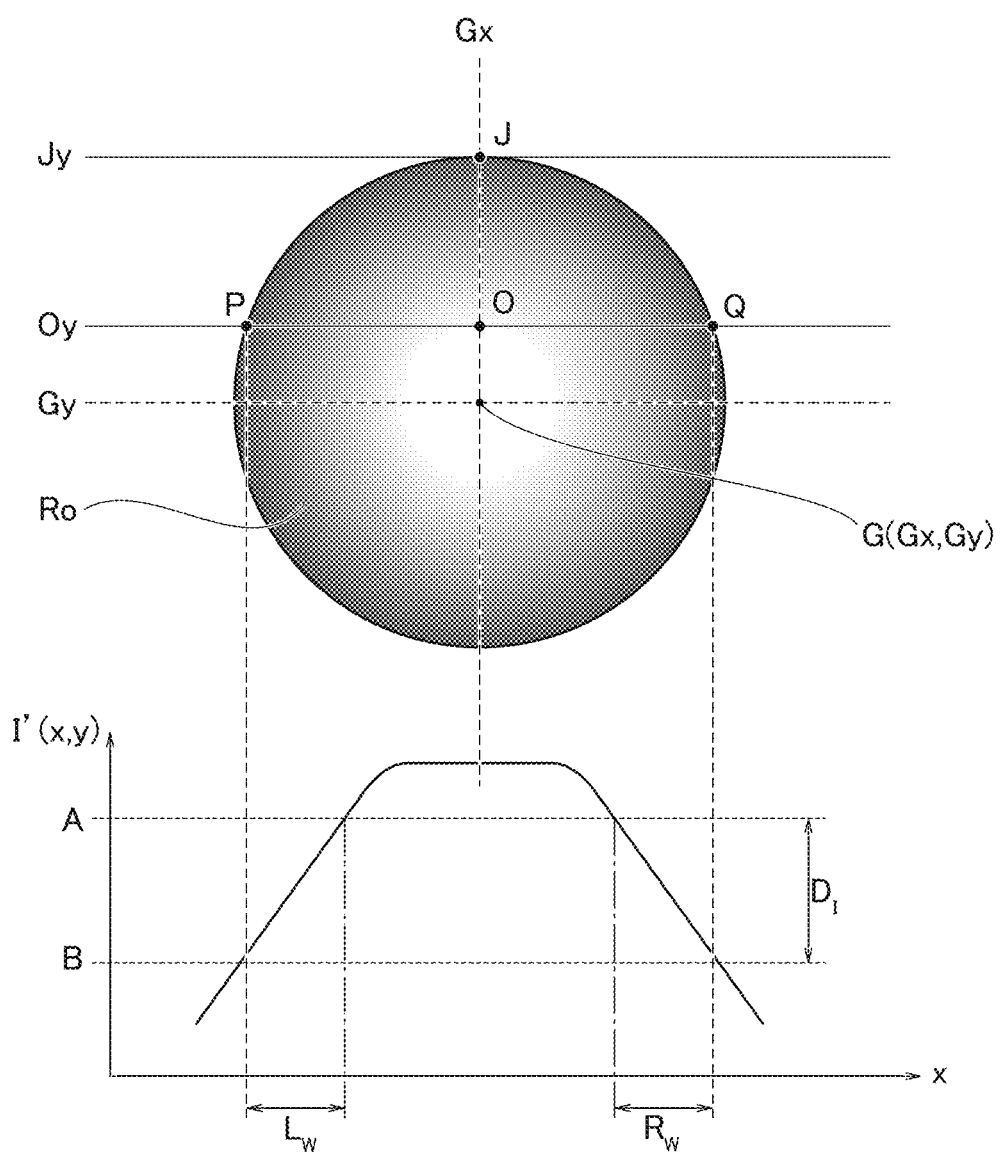
FIG. 10 is a view explaining an example of a predetermined line to calculate a brightness gradient in the white turbid state diagnostic apparatus according to Embodiment 1 and an example of the brightness gradient.

The brightness gradient calculation processing in step S15 of FIG. 4 will be explained in detail with reference to FIGS. 9 and 10. FIG. 9 is a flowchart showing a flow of the brightness gradient calculation processing performed in the brightness gradient calculation part 30. FIG. 10 is a view explaining an example of predetermined lines to calculate a brightness gradients and an example of brightness gradients calculated on the predetermined lines.

In step S30 of FIG. 9, a scanning start point O to calculate a brightness gradient g is set in the minified image I' (x, y).

A method for setting the scanning start point O is explained with reference to FIG. 10. FIG. 10 shows the region $R_0$ of the image of the headlight detected in the region detection processing explained with reference to FIG. 5 and brightness distribution of the predetermined line within the region.

For example, when driving in the rain, splash raised by the vehicle 5, reflection of a headlight of a following vehicle from a road surface, or headlight of a vehicle running in an adjacent lane appears as a bright image in the obtained image I(x, y). These images might appear at a position overlapping the region $R_0$ of the image of the headlight of the following vehicle running in the same lane $L_2$ as the vehicle 5, which is to be obtained or at a position close to the region $R_0$. These images become factors to derange the brightness gradient g of the region $R_0$.

Accordingly, it is necessary to set the scanning start point and a scanning direction (line) such that the brightness gradient g can be calculated without being affected by these images even when the images are included in the region.

In case where there exists water on a driving road surface, tires of the vehicle 5 can rotate and splash the water on the road surface in the air. In this case, fine water droplets floating in the air are illuminated by the headlight of the following vehicle, or the like to form a bright image at a lower part of the region $R_0$ in the minified image I'(x, y).

The reflection of the headlight of the following vehicle from the road surface appears at a part lower than the region $R_0$ in the minified image I'(x, y).

There is a high possibility that the image of the headlight of the vehicle running in an adjacent lane appears at a substantially same vertical position as the region $R_0$ in the minified image I'(x, y).

Accordingly, if the brightness gradient g of the region $R_0$ is calculated at as an upper part as possible from the centroid position G of the region $R_0$ in the minified image I'(x, y), the above described influence of the images can be reduced.

Therefore, in Embodiment 1, as shown in FIG. 10, the scanning start point O to calculate the brightness gradient g is set between the centroid position G of the region $R_0$ and an upmost point J of the region $R_0$.

Actually, a vertical coordinate Oy of the scanning start point Oy is obtained by equation (3):

$$Oy = Jy + (Gy - Jy)/Th_y \quad (3)$$

where Jy is a vertical coordinate Jy of the upmost point J of the region $R_0$. The threshold value $Th_y$ is set to a value which is larger than 0. The threshold value $Th_y$ may be set based on experiments or the like.

In step S31, the scanning direction to calculate the brightness gradient is set. In this embodiment, scanning directions parallel to a horizontal line passing the scanning start point O and the centroid position G are set as a scanning direction OP and a scanning direction OQ. The scanning direction OP and the scanning direction OQ set as described above are the above-described predetermined lines.

Next, in step S32, the brightness values stored in the minified image I'(x, y) are read from the scanning start point O to a point P on the scanning direction OP to calculate the brightness distribution.

In step S33, the brightness values stored in the minified image I' (x, y) are read on the scanning direction OQ to calculate the brightness distribution.

The brightness distributions calculated as described above are shown in a graph in a lower part of FIG. 10. The graph shows the brightness distribution on the scanning direction OP and the brightness distribution on the scanning direction OQ in a single graph for the sake of explanation.

In step S34, a size of a skirt of the brightness distribution in a horizontal direction is obtained. Here, a threshold value A of the brightness value and a threshold value B of the brightness value, which is less than the threshold value A are previously prepared. In the previously generated brightness distribution, the brightness values are scanned from the scanning start point O to the point P in a leftward direction to calculate an interval between a position where the brightness value goes down under the threshold value A and a position where the brightness value goes down under the threshold value B as a horizontal pixel number Lw. The brightness values is scanned from the scanning start point O to the point Q in a rightward direction to calculate an interval between a position where the brightness value goes down under the threshold value A and a position where the brightness value goes down under the threshold value B as a horizontal pixel number Rw.

Although description is omitted in FIG. 9, the reading processing of the brightness values is stopped if, when the brightness value is read over the scanning direction, the brightness value goes down under the threshold value A and then goes up again over the threshold value A or if the brightness value increases by a threshold value C from the adjacent one, which is judged that an image from another light source is included. When the reading of the brightness values is stopped, the process returns to the main routine (FIG. 4) to perform a next image input.

In step S35, the brightness gradient g is calculated. More specifically, the brightness difference $D_I$ (=A−B) which is a difference between the threshold value A and the threshold value B is used to calculate the brightness gradient g on the scanning direction OP as $D_I$/Lw, and calculate the brightness gradient g on the scanning direction OQ as $-D_I$/Rw. Then, the processing in FIG. 9 is terminated and the process returns to the main routine (FIG. 4).

Figure 12:
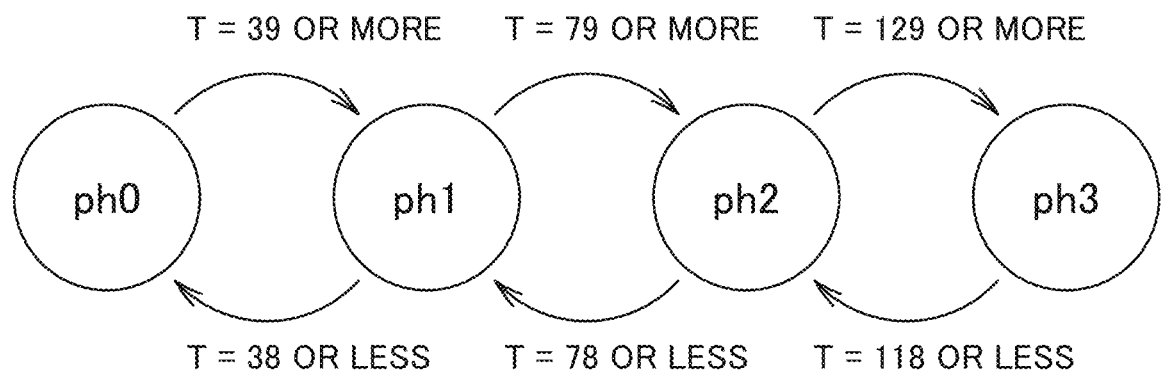
FIG. 12 is a view explaining a state shift showing a shift of a certainty of the white turbid level in the white turbid state diagnostic apparatus according to Embodiment 1.

Next, the white turbid level calculation processing in step S16 of FIG. 4 will be explained in detail with reference to FIGS. 11 and 12. FIG. 11 is a flowchart showing a flow of the white turbid level calculation processing performed in the white turbid level calculation part 40. FIG. 12 is a view explaining state transition showing shifts of certainty of the white turbid level.

In step S40, it is judged whether or not the left and right brightness gradients g of the region $R_0$ have symmetry. The symmetry judgment is performed by confirming whether or not a gap $G_I$ of the brightness gradients g, calculated by equation (4) is a predetermined threshold value $Th_G$ or less.

$$G_I = (|Lw| - |Rw|)/(|Lw| + |Rw|) \quad (4)$$

In case where a plurality of regions continuously appear in a horizontal direction, an amount of the left brightness gradient g is different from an amount of the right brightness gradient g and therefore the gap $G_I$ calculated by equation (4) becomes larger than the threshold value $Th_G$. In this case, the calculation of the white turbid level is not performed and the process moves to step S48.

In step S41, the white turbid level U of the lens 12 is calculated. The white turbid level U is calculated by an average value of the left and right brightness gradients g calculated above, as shown in equation (5).

$$U = \{(D_I/Lw) + (D_I/Rw)\}/2 \quad (5)$$

The white turbid level U calculated as described above is the diagnosis result of the white turbid level by the white turbid state diagnostic apparatus 8. This processing is performed in the brightness gradient average value calculation section 42 shown in FIG. 1.

In step S42, it is judged whether or not the previously detected region $R_0$ is identical to a region $R_0$ detected at one step before, that is, whether or not the images are from the same light source.

This judgment is performed by comparing an average value Ave(U) of the white turbid levels U calculated in the previous processing with the latest white turbid level U calculated by equation (5). When a difference between the average value Ave(U) of the previous white turbid levels U and the latest white turbid level U is small, it is judged that the images are generated from the same light source at the region.

This processing is performed in the similarity calculation section 44 shown in FIG. 1. More specifically, when equation (6) is satisfied, it is judged that the images are generated from the same light source:

$$Th_{LOW} < U/\text{Ave}(U) < Th_{HIGH} \qquad (6)$$

where $Th_{LOW}$ is a lower threshold value to judge that the images are from the same light source, and $Th_{HIGH}$ is an upper threshold value to judge that the images are from the same light source.

In step S43, if it is judged that the images are from the same light source in step 42, then an overall count T showing that the images which are considered from the same light source are continuously detected is incremented and the process moves to step S44. Processings after step S43 are performed in the certainty determination section 46 shown in FIG. 1. A value of the overall count T which is incremented in step S43 is stored as needed in the certainty determination section 46.

On the other hand, if it is judged that the images are not from the same light source in step S42, then in step S47, the overall count is decremented and the process moves to step S48. The processing in step S42 is performed by the certainty determination section 46 shown in FIG. 1. A value of the overall count T is stored as needed in the certainty determination section 46.

In step S44, the white turbid level U previously calculated in step S41 is stored in the certainty determination section 46.

In step S45, the white turbid level U previously calculated in step S41 is used to update an average value Ave(U) of the white turbid levels U calculated in the previous processings. The updated average value Ave(U) of the white turbid levels is stored in the certainty determination section 46.

Next, in step S46, an error $e_U$ of the white turbid level U is calculated. The error $e_U$ is obtained by equation (7) by using the updated average value Ave(U) of the white turbid levels in step S45 and a standard deviation STD(Ave(U)) calculated from the average value Ave(U).

$$e_U = \text{STD}(\text{Ave}(U))/\text{Ave}(U) \qquad (7)$$

Next, in step S48, a certainty F of the calculated white turbid level is judged. The certainty F is expressed by a value of the overall count T. As the value T is larger, that is, as more images considered from the same light source are continuously detected, the higher certainty F of the white turbid level U is judged.

In this embodiment, as shown in FIG. 12, the certainty F is managed by dividing into 4 levels (Ph0, Ph1, Ph2, Ph3). The level of the certainty F is shifted according to the value T.

That is, in FIG. 12, in an initial state, the level of the certainty F is Ph0. If the value of the overall count T showing that the images considered from the same light source are continuously detected exceeds 39 (corresponding to 19.5 seconds with a processing period of 0.5 second), the level of the certainty F is shifted to Ph1. Then, if the value of the overall count T exceeds 79 (corresponding to 39.5 seconds with a processing period of 0.5 second), the level of the certainty F is shifted to Ph2. If the value of the overall count T exceeds 129 (corresponding to 64.5 seconds with a processing period of 0.5 second), the level of the certainty F is shifted to Ph3.

On the other hand, when the level of the certainty F is Ph3, and the value of the overall count T is decremented and goes down under 118, the level of the certainty F is shifted to Ph2. Then, if the value of the overall count T goes down under 78, the level of the certainty F is shifted to Ph1. If the value of the overall count T goes down under 38, the level of the certainty F is shifted to Ph0.

When the certainty F is shifted to another level, in order to prevent hunting where the certainty F returns back to the original level, if the certainty F is shifted to a higher level, ten counts may be added to the overall count T, and if the certainty F is shifted to a lower level, twenty counts may be subtracted from the overall count T. When the update of the certainty F is performed, the processing of FIG. 11 is terminated and the process returns to the main routine (FIG. 4).

Although it is not disclosed in FIG. 11, in case where it is judged that the left and right brightness gradients g of the region $R_0$ do not have symmetry in step S40, in step S48, the value of the overall count T may be decremented.

After the process returns to the main routine (FIG. 4), in step S17 of FIG. 4, the white turbid level U of the lens 12, calculated in step S16, the error $e_u$ of the white turbid level, and the certainty F are delivered to the approaching vehicle detection section 60 through the white turbid level delivering part 50.

In step S18 of FIG. 4, in the approaching vehicle detection section 60 and the alert output section 70, the behavior control of the BSW system is performed according to the flowchart of FIG. 13. Hereinafter, the processing will be explained in detail with reference to FIG. 13.

In step S50 of FIG. 13, it is judged whether or not the white turbid level U is the threshold value $Th_U$ or less, the error $e_U$ of the white turbid level U is the threshold value $Th_e$ or less, and the certainty F is Ph3. That is, it is confirmed that it is judged that the white turbid level is high with high certainty.

If it is judged the conditions of step S50 are satisfied, it is judged that the white turbid level U of the lens 12 is high and the BSW system 9 is shifted to be in a fail-state. Then, the approaching vehicle detection section 60 and the alert output section 70 stop their functions and it is notified to the driver that the BSW system 9 is shifted to the fail-state because of the white turbidity of the lens 12. Then, the processing of FIGS. 3A and 3B is terminated and the process returns to the main routine (FIG. 4).

Once the system is shifted to the fail-state, a preliminarily prepared timer is activated to maintain the fail-state until a predetermined time elapses.

The driver of the vehicle 5 may check the white turbid level of the lens 12 at a timing when stopping the vehicle 5 and remove the white turbidity as needed to have the BSW system 9 available again.

On the other hand, if it is judged that the conditions of step S50 are not satisfied, that is, it is not judged that the white turbid level U is high, the processing of FIG. 13 is terminated, the process returns to the main routine (FIG. 4), and the BSW system 9 continues to operate.

The behavior control of the BSW system 9 is not limited to having the system be in a fail-state as described above. That is, if the white turbid level of the lens 12 is high, a threshold value for an edge detection in image processings performed in the approaching vehicle detection section 60 may be reduced so that edge constituting points constituting the vehicle 6 can be certainly detected even when the white turbidity of the lens 12 causes blur or bleed. Further, another behavior control may be performed using the white turbid level U, the error $e_u$ of the white turbid level, and the certainty F.

As described above, according to the white turbid state diagnostic apparatus 8 of an embodiment of the present invention, in an imaging part 10 installed on a vehicle 5 and configured to image periphery of the vehicle 5, a light signal transmitting a lens 12 is converted into an image signal I(x, y) in a photoelectric conversion section 14; and a region detection part 20 detects a region $R_0$ having brightness values which are over a predetermined brightness and a substantially circular shape having an area which is a predetermined area or more. A brightness gradient calculation part 30 sets scanning directions (lines) OP, OQ from a scanning start point O in the detected region $R_0$, and reads brightness values of pixels where the set lines pass to calculate brightness gradients on the lines. The white turbid level calculation part 40 calculates a white turbid level U of the lens 12 based on the brightness gradients g calculated by the brightness gradient calculation part 30. Therefore, by focusing on only predetermined lines in the region $R_0$ constituted by pixels having high brightness values, the brightness gradient g which varies according to the white turbid level U of the lens 12 can be steadily detected and thereby the white turbid level U can be certainly diagnosed.

According to the white turbid state diagnostic apparatus 8 of an embodiment of the present invention, in a gain adjustment section 16 configured to adjust a gain when light around the vehicle 5 is converted into an image signal, the white turbid level U is calculated in the white turbid level calculation part 40 with respect to the image I(x, y) obtained by the imaging part 10 only when the gain is adjusted to be larger than a predetermined value. Accordingly, since the white turbid level U of the lens 12 is diagnosed only in dark environment where an image of a bright light source such as lighting, or the like is observed with a high SN ratio, an image expanded by being scattered by the white turbidity of the lens 12 can be certainly detected and the white turbid level U can be certainly diagnosed.

According to the white turbid state diagnostic apparatus 8 of an embodiment of the present invention, when a horizontal position of the scanning start point O is set to a horizontal position Gx of a centroid position G of the region $R_0$, and a vertical position of the scanning start point O is set to a position between a horizontal line passing the centroid position G of the region $R_0$ and a horizontal line passing an upmost point of the region $R_0$, scanning directions (lines) OP, OQ to calculate the brightness gradients g are set such that the scanning direction OP is directed leftward in the horizontal direction from the scanning start point O, and the scanning direction OQ is in a symmetry manner with the scanning direction OP in the horizontal direction with respect to a line extending vertically in the image and passing the centroid position G of the region $R_0$. Therefore, splash from the vehicle 5, reflection of a headlight of a following vehicle from a road surface, a headlight of a vehicle running in an adjacent lane, and the like, which appear at a lower part of the image than the centroid position G of the region $R_0$ can be prevented from being included. Thereby, brightness gradient g with high certainty can be calculated and therefore a high certainty diagnosis of the white turbid level U can be performed. Since the scanning directions are set in a bilaterally symmetrical manner, a gap $G_I$ of the brightness gradient g can be evaluated by use of symmetry of expansion of an image of a light source. Thereby, brightness gradient g with high certainty can be calculated and the white turbid level U can be more certainly diagnosed.

According to the white turbid state diagnostic apparatus 8 of an embodiment of the present invention, a white turbid level U is diagnosed based on a brightness gradient g in a region $R_0$ formed by a lighting headlight of another vehicle, imaged by the imaging part 10. Thereby, high SN image can be obtained and therefore the white turbid level U can be certainly diagnosed.

According to the white turbid state diagnostic apparatus 8 of an embodiment of the present invention, a white turbid level U is diagnosed based on a brightness gradient g in a region $R_0$ formed by a lighting headlight of a vehicle running in the same lane as the vehicle 5 in a backward position of the vehicle 5. Therefore, an image of a light source can be observed at a position which is previously expected, and thereby a region to detect the image of the light source can be restricted to improve efficiency of image signal processings.

According to the white turbid state diagnostic apparatus 8 of an embodiment of the present invention, a brightness gradient g is calculated as a pixel number between a position where a brightness value of a minified image I'(x, y) where predetermined scanning directions (lines) pass goes down under a first threshold value A and a position where the brightness value goes down under a second threshold value B which is less than the first threshold value A. Thereby, the brightness gradient g can be certainly calculated with a simple processing.

According to the white turbid state diagnostic apparatus 8 of an embodiment of the present invention, a white turbid level calculation part 40 has a similarity calculation section 44 to calculate a similarity of regions $R_0$ detected from image signals I(x, y) imaged at different times, and a certainty determination section 46 to determine certainty F of a white turbid level U according to a number of imaging times when a state where the similarity is higher than a predetermined value is continuously detected. Therefore, certainty of diagnosis result of a white turbid level can be improved.

According to the white turbid state diagnostic apparatus 8 of an embodiment of the present invention, it is judged that similarity is high when a ratio of an average value Ave(U) of a plurality of previously obtained white turbid levels U and the latest white turbid level U is within a predetermined range. Therefore, the certainty of a diagnosis result of the white turbid level U can be improved with a simple signal.

In Embodiment 1, the white turbid level U is diagnosed when a vehicle speed of the vehicle 5 is a predetermined value or more. This is because the BSW system 9 executed at the same time as the diagnosis of the white turbid level U is a system which operates at a certain vehicle speed or more and the operation of the diagnosis of the white turbid level U is matched with the operation of the BSW system 9. However, it is not necessary to operate with restriction of a vehicle speed, and the diagnosis of the white turbid level U may be performed at a vehicle speed of 0.

In Embodiment 1, as the photoelectric conversion section 14 of the imaging part 10, a CMOS type element is used but it is not limited thereto. That is, a CCD type element may be used. If the CCD type element is used, when high brightness light source such as a headlight is imaged, a phenomenon (smear) where electrical charges stored in the photoelectric conversion section 14 overflow occurs and bright bands having the same width as an image of a headlight at upper and lower parts of the image occur. Accordingly, by performing a filtering processing to remove a vertically elongated rectangular region to remove the bands generated by the smear and then the above processing may be performed.

In Embodiment 1, an on-vehicle image processing system operated at the same time as the white turbid state diagnostic apparatus 8 is not limited to the BSW system 9. That is, a lane departure warning (LDW) system detecting a lane departure to alert or any other system may be applicable.

In Embodiment 1, a white turbid level occurring on a surface of the lens 12 is diagnosed. However, some on-vehicle image processing system executed at the same time as the diagnosis of the white turbid level may have a configuration where the imaging part 10 is installed in a vehicle interior and observes exterior through a windshield of the vehicle 5. In this case, a white turbidity occurs on a front surface of the windshield but not on the surface of the lens 12. In Embodiment 1, the white turbid level of the front surface of the windshield can be diagnosed by the same processings as those described above.

Embodiment 2

Next, a second embodiment of the white turbid state diagnostic apparatus of the present invention will be explained.

This embodiment is an example where a white turbid state diagnostic apparatus according to the present invention is applied to a vehicle having a BSW system, similarly to Embodiment 1. Differences from Embodiment 1 are in a method for setting a predetermined line to calculate a brightness gradient for a diagnosis of a white turbid level and in that the apparatus has a lens cleaning function to clean a lens surface when the white turbid level is high.

Hereinafter, Embodiment 2 of the white turbid state diagnostic apparatus of the present invention will be explained with reference to drawings.

Figure 14:
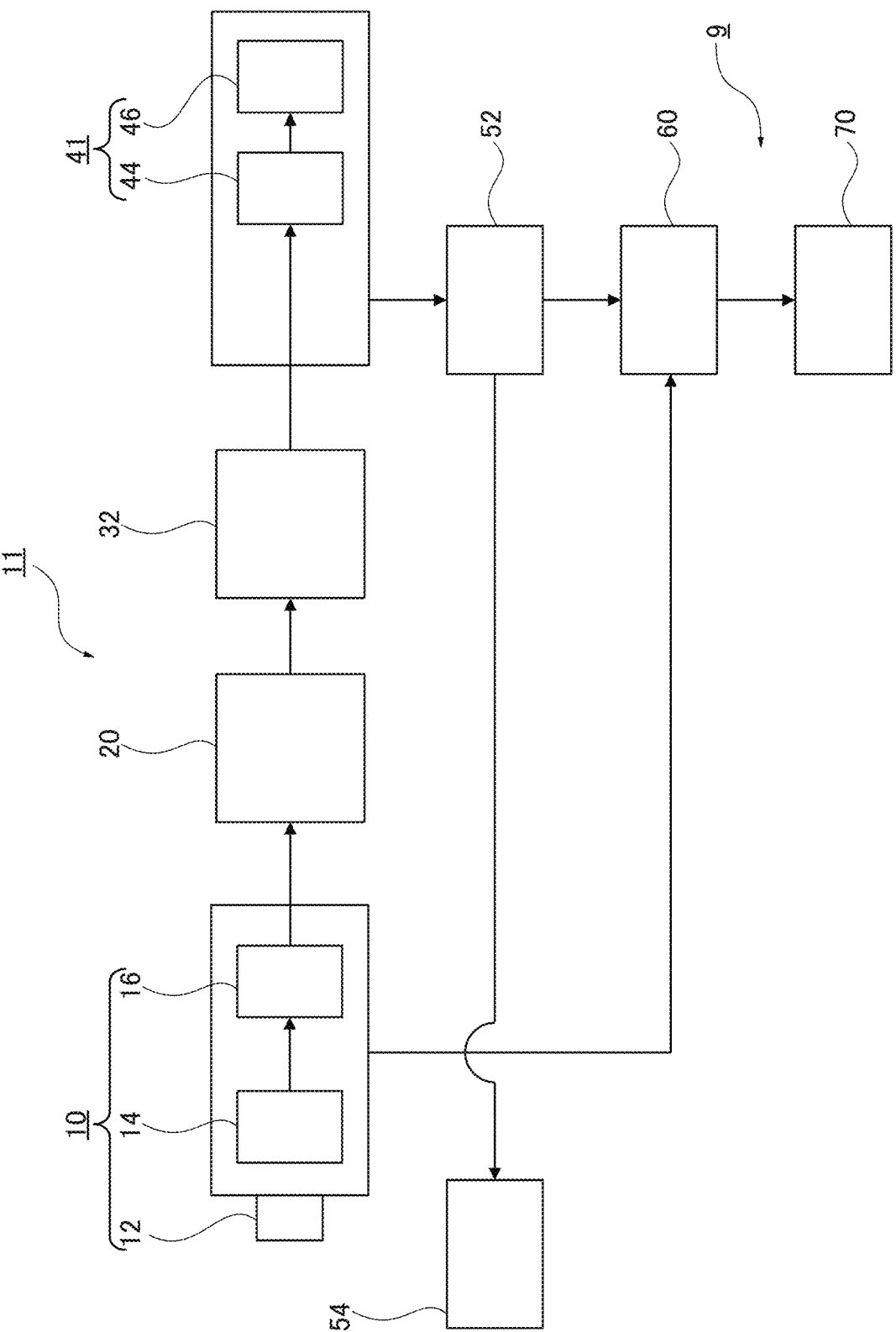
FIG. 14 is a block diagram schematically showing a configuration of a white turbid state diagnostic apparatus according to Embodiment 2.

FIG. 14 shows an example where the white turbid state diagnostic apparatus according to this embodiment.

As shown in FIG. 14, the white turbid state diagnostic apparatus 11 according to Embodiment 2 is installed near a rear license plate of the vehicle 5 (shown in FIG. 1). The white turbid state diagnostic apparatus 11 includes an imaging part 10 observing a range ω shown in FIG. 1, a region detection part 20 to detect an image of a headlight of a following vehicle from the image obtained by the imaging part 10, a brightness gradient calculation part 32 to calculate a brightness gradient on a predetermined line in a region detected by the region detection part 20, a white turbid level calculation part 41 to calculate a white turbid level of a lens 12 based on the brightness gradient calculated by the brightness gradient calculation part 32, and a white turbid level delivering part 52 to deliver the white turbid level calculated by the white turbid level calculation part 41 to a later-described lens cleaning section 54 and an approaching vehicle detection section 60.

The white turbid level calculation part 41 has a similarity calculation section 44 to judge whether or not regions detected by the region detection part 20 at different times are images formed from the same light source, and a certainty determination section 46 to determine certainty of the calculated white turbid level.

The white turbid state diagnostic apparatus 11 according to Embodiment 2 cooperates with the BSW system 9 having the approaching vehicle detection section 60 to detect an approaching vehicle from the image obtained by the imaging part 10 and an alert output section 70 to alert by an indicator or a buzzer when the approaching vehicle is detected by the approaching vehicle detection section 60.

The white turbid state diagnostic apparatus 11 according to Embodiment 2 has the lens cleaning section 54 having a cleaning function to clean a surface of the lens 12.

A diagnosis method in the white turbid state diagnostic apparatus 11 according to Embodiment 2 will be explained. The flow is substantially the same as FIG. 4 and therefore only parts different therefrom will be explained below.

It is the same as Embodiment 1 that the diagnosis of the lens white turbid state is performed only when the value of the gain in the gain adjustment part 16 is larger than the predetermined value. It is also the same as Embodiment 1 that the diagnosis of the lens white turbid state is performed based on the brightness gradient on the predetermined line in the image of the headlight by use of the image of the headlight of the following vehicle running in the same lane $L_2$ as the vehicle 5.

Figure 15:
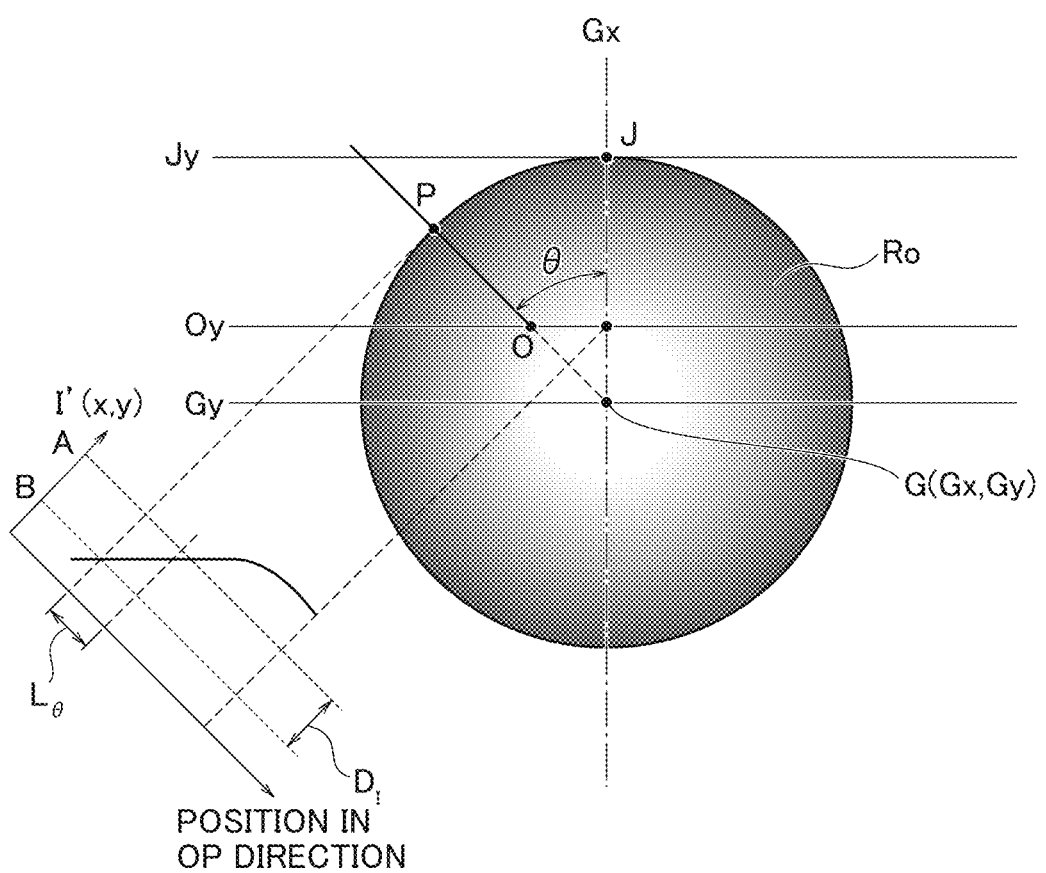
FIG. 15 is a view explaining an example of a predetermined line to calculate a brightness gradient in the white turbid state diagnostic apparatus according to Embodiment 2 and an example of the brightness gradient.
Figure 16:
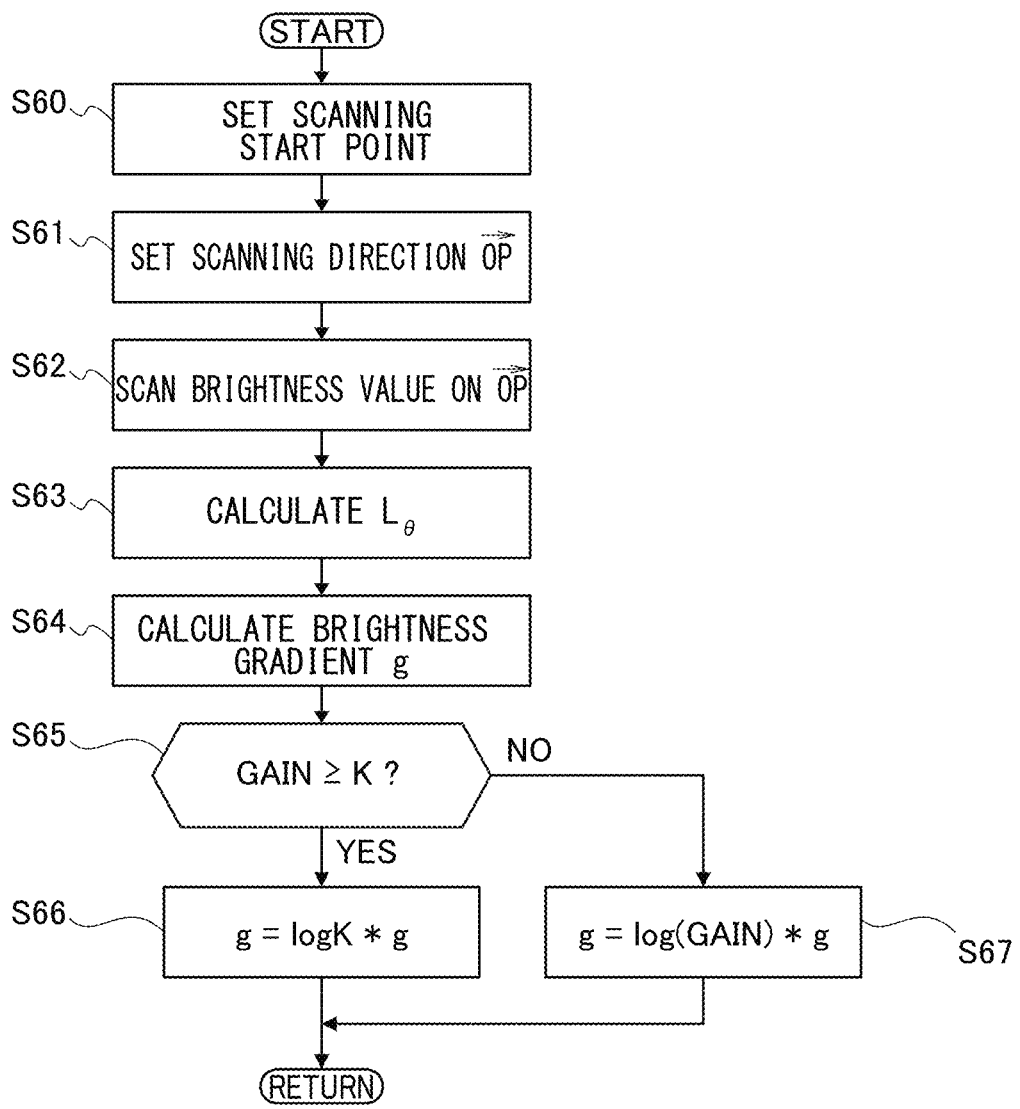
FIG. 16 is a flowchart of a brightness gradient calculation processing performed in a brightness gradient calculation part in the white turbid state diagnostic apparatus according to Embodiment 2.

A method for calculating a brightness gradient in the brightness gradient calculation part 32 is different from that in Embodiment 1. Hereinafter, the method for calculating the brightness gradient will be explained in detail with reference to FIGS. 15 and 16. FIG. 15 is a view explaining an example of a predetermined line to calculate a brightness gradient and an example of a brightness gradient calculated on the predetermined line. FIG. 16 is a flowchart showing a flow of the brightness gradient calculation processing performed in the brightness gradient calculation part 32.

In this embodiment, as shown in FIG. 15, a vertical coordination Oy of a scanning start point O is set between a centroid position G of a region $R_0$ and an upmost point J of the region $R_0$ (step S60).

A scanning direction OP to scan brightness values is set in a direction from the centroid position G of the region $R_0$ to a circumferential edge of the region $R_0$ (step S61).

As shown in FIG. 15, the scanning direction OP from the scanning start point O to the circumferential edge of the region $R_0$ is set in a direction of an angle θ with respect to a line passing the centroid position G from the centroid position G of the region $R_0$ in a vertical direction.

The brightness values on the scanning direction OP are read and a brightness distribution as shown in Graph of FIG. 15 is obtained (step S62).

From the brightness distribution, a pixel number $L_θ$ is calculated, which is a pixel number in the angle θ direction from a position where the brightness distribution on the scanning direction OP goes down under a threshold value A (first threshold value) to a position where the brightness distribution goes down under a threshold value B (second threshold value) which is smaller than the threshold value A (step S63).

Then, by use of a brightness difference $D_I$ (=A−B), the brightness gradient g is calculated as $D_I/L_θ$ (step S64).

As described above, the scanning direction to calculate the brightness gradient g is not limited to the horizontal direction as described in Embodiment 1 and may be set to a direction with an angle θ with respect to the vertical direction from the centroid position G of the region $R_0$. Even with this setting, since the scanning direction can be set to an upper side from the centroid position G of the region $R_0$, on the set scanning direction, an image due to splash from the vehicle 5, reflection of a headlight of a following vehicle from a road surface, or a headlight of a vehicle running in an adjacent lane is barely included. Accordingly, an accurate brightness gradient g without any affection of these images can be calculated.

Next, the calculated brightness gradient g is corrected according to a value of a gain adjusted in the gain adjustment part 16. That is, if the gain value is a predetermined value K or more (YES in step S65), the calculated brightness gradient g is multiplied by a logarithm natural of the predetermined value K to generate a new brightness gradient g (step S66).

If the gain value is smaller than the predetermined value K (NO in step S65), the calculated brightness gradient g is multiplied by a logarithm natural of the current gain adjusted in the gain adjustment part 16 to generate a new brightness gradient g (step S67).

Due to such a correction, when the gain value is within a range from 0 to the predetermined value K, a relationship between the gain value and the brightness value of the obtained image can be approximated by a logarithmic function and therefore by multiplying the brightness value of the obtained image by a logarithm natural of the gain value used when the image is obtained to correct into the more accurate brightness value. By performing such a correction, more accurate brightness gradient g can be calculated and thereby the white turbid level U can be more accurately diagnosed.

As described above, after the brightness gradient g is calculated, in Embodiment 1, the left and right brightness gradients are averaged to calculate the white turbid level. However, in Embodiment 2, the brightness gradient g is calculated from the brightness distribution in one direction, and therefore the calculated brightness gradient is itself the white turbid level U.

In Embodiment 1, the gap $G_I$ is calculated based on the brightness distributions in two directions and evaluates the symmetry of the image of the light source. However, in Embodiment 2, the symmetry is not evaluated.

Therefore, the flow of the diagnosis of the white turbid level in Embodiment 2 is shown by the flowchart of FIG. 11 explained in Embodiment 1, from which step S40 to evaluate the symmetry in the horizontal direction and step S41 to calculate a white turbid level by averaging the brightness gradients in two directions are eliminated.

Similarly to Embodiment 1, it is judged whether the images are from the same light source, and the certainty F is improved as more images from the same light source are continuously detected to improve the certainty of the diagnosis of the white turbid level U.

If the white turbid level U is the threshold value $Th_U$ or less (high white turbid level), the error $e_U$ of the white turbid level U is the threshold value $Th_e$ or less, and the certainty F is Ph3, it is judged that the lens 12 has white turbidity, and the parameters such as the white turbid level U and the like are delivered to the approaching vehicle detection section 60 and the lens cleaning section 54 through the white turbid level delivering part 52.

Then, cleaning agent is sprayed onto the surface of the lens 12 in the lens cleaning section 54 to clean the surface of the lens 12.

The BSW system 9 performs behavior control such as setting the BSW system 9 in a fail-state during the cleaning of the lens 12 is performed after the parameters such as the white turbid level U and the like are received. After the cleaning of the lens 12 is completed, the BSW system 9 is activated again.

The BSW system may be activated after the cleaning of the lens 12 is completed, and then the above-described white turbid diagnosis is performed and it is confirmed that the white turbidity is clearly removed.

As described above, in Embodiment 2, the brightness gradient is calculated only in one direction. The scanning direction OP can be set to a direction where images other than the headlight of the following vehicle are barely included and therefore the brightness gradient with high certainty can be calculated and the white turbid level can be accurately diagnosed. Furthermore, the brightness distribution can be generated in a short time to improve efficiency of the processings.

The scanning direction to calculate the brightness gradient g is not limited to the above described direction and may be set as shown in FIGS. 17A to 17E.

Figure 17A:
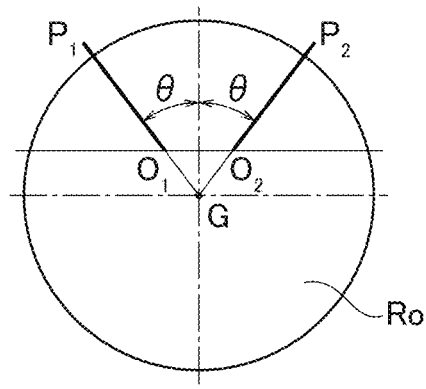
FIGS. 17A to 17E are views explaining other examples of the predetermined line to calculate a brightness gradient in the white turbid state diagnostic apparatus according to Embodiment 2.
Figure 17B:
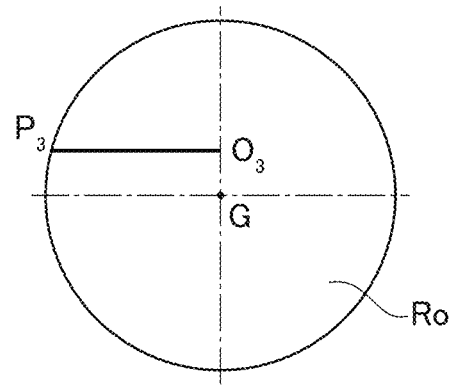
Figure 17C:
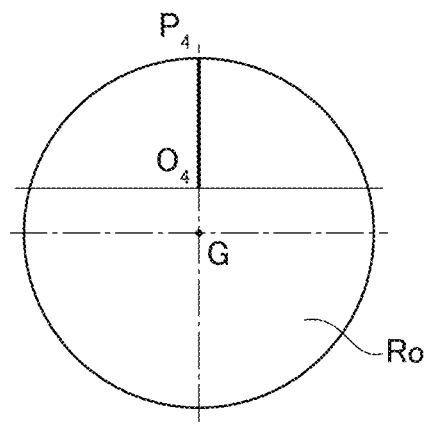

That is, as shown in FIG. 17B, in the region $R_0$, the scanning start point O is set at an upper position from the centroid position G of the region $R_0$ on a line extending in a vertical direction and passing the centroid position G. Then, a horizontal line extending from the scanning start point in a leftward direction may be set as the scanning direction $O_3P_3$. Further, as shown in FIG. 17C, in the region $R_0$, a scanning start point $O_4$ is set at an upper position from the centroid position G of the region $R_0$ on a line extending in a vertical direction and passing the centroid position G. Then, a vertical line extending from the scanning start point $O_4$ in an upward direction may be set as the scanning direction $O_4P_4$.

As explained in Embodiment 1, a plurality of scanning directions may be set. In this case, not only the scanning directions in the horizontal direction as described in Embodiment 1, but as shown in FIG. 17A, in the region $R_0$, scanning directions $O_1P_1$, $O_2P_2$ may be set, each extending in an upward and left or right direction with an angle θ with respect to the vertical line from the centroid position G of the region $R_0$. In this case also, the scanning start points $O_1$, $O_2$ are set at an upper side from the centroid position G of the region $R_0$.

In case where a plurality of scanning directions are set, as explained in Embodiment 1, the white turbid level U may be obtained by averaging the brightness gradients g calculated in the respective scanning directions. Furthermore, in case where a plurality of scanning directions are set, a gap $G_I$ of the brightness gradients may be calculated as explained in Embodiment 1 to judge validity of the detected region $R_0$ based on the gap $G_I$ of the brightness gradient g.

Figure 17D:
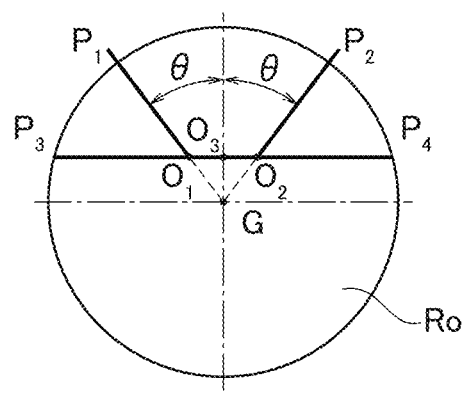

As the scanning directions, as shown in FIG. 17D, further more directions may be set. FIG. 17D shows an example where in addition to the scanning directions $O_1P_1$, $O_2P_2$ set according to FIG. 17A, a scanning direction $O_3P_3$ extending in a leftward direction and a scanning direction $O_4P_4$ are set.

The brightness gradients g calculated in the respective scanning directions set as described above are averaged to obtain the white turbid level U and the gap $G_I$ of the brightness gradients g is calculated to judge validity of the detected region $R_0$.

In FIGS. 17A and 17D, the plurality of scanning directions are set to have the symmetry in the horizontal direction with respect to a vertical line passing the centroid position G of the region $R_0$. However, it is not limited thereto. That is, a plurality of scanning directions may be set, which are not bilaterally symmetric with respect to the vertical line passing the centroid position G of the region $R_0$.

Especially, in case where the white turbidity on the surface of the lens 12 is in a substantially circular shape, that is, the white turbidity has isotropy from the centroid position G of the region $R_0$, the brightness gradient g along the scanning direction from the centroid position G of the region $R_0$ to the circumferential edge of the region $R_0$ is in the substantially same shape regardless of the direction. Accordingly, a plurality of scanning directions can be set without considering the bilateral symmetry in each scanning direction.

The brightness gradients g calculated in the respective scanning directions set as described above are averaged to obtain the white turbid level U and the gap $G_I$ of the brightness gradients g is calculated to judge validity of the detected region $R_0$.

When further more scanning directions are set, after a brightness gradient g in each scanning direction is calculated, the scanning direction from which the brightness gradient g having an abnormal value is calculated may be dismissed and the brightness gradients g calculated from the other scanning directions may be averaged to calculate the white turbid level U. Thereby, in case where noise occurs unexpectedly in a particular direction, the brightness distribution is read in the other scanning directions than the particular direction to calculate the brightness gradients g and influence from noise is reduced. Therefore, the brightness gradient g with high certainty can be calculated and thereby the white turbid level U with high certainty can be calculated.

Figure 17E:
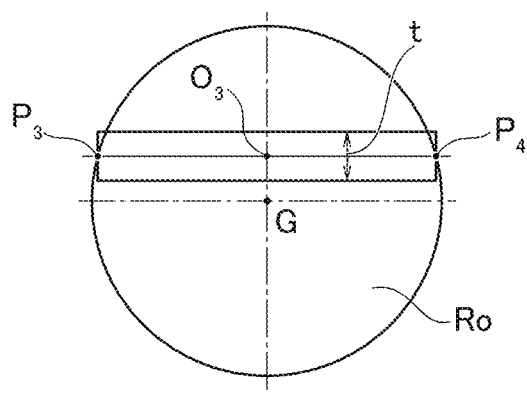

The scanning direction may be set as an elongated region as shown in FIG. 17E instead of a line. In FIG. 17E, the scanning start point $O_3$ is set on a vertical line passing the centroid position G of the region $R_0$ in the region $R_0$, and a scanning direction $O_3P_3$ extending in a leftward direction and a scanning direction $O_3P_4$ extending in a rightward direction from the scanning start point $O_3$ are set. Then, a region having a thickness t in an orthogonal direction to the scanning direction $O_3P_3$ and the scanning direction $O_3P_4$ is set.

In the brightness gradient calculation part 32, a value of a sum of the brightness values in a direction perpendicular to the scanning direction $O_3P_3$ (thickness t direction) within the set region over the scanning direction $O_3P_3$ is calculated to calculate a distribution of the value of the sum along the scanning direction $O_3P_3$.

From the distribution of the value of the sum, the brightness gradient g is calculated, similarly to the above-explanation. The first threshold value A and the second threshold value B set when calculating the brightness gradient g are set as other threshold values in accordance with the thickness t of the set region.

With respect to the scanning direction $O_3P_4$, similarly to the above, a value of a sum of the brightness values is calculated and then the brightness gradient g is calculated.

Then, the white turbid level U is calculated similarly to the above explanation to perform diagnosis of the white turbid level U.

As described above, by setting a region elongated in the scanning direction, even when unexpected noise is included, influence of the noise can be reduced compared to the case where a line is used as a scanning direction. Accordingly, a steady brightness gradient g can be calculated and diagnosis of the white turbid level U can be performed with high certainty.

As described above, according to the white turbid state diagnostic apparatus 11 of an embodiment of the present invention, when a horizontal position of the scanning start point O is set to a horizontal position Gx of a centroid position G of the region $R_0$, and a vertical position of the scanning start point O is set to a position between a horizontal line passing the centroid position G of the region $R_0$ and a horizontal line passing an upmost point of the region $R_0$, a scanning direction (line) to calculate the brightness gradient g is set such that the scanning direction OP is directed leftward in the horizontal direction from the scanning start point O. Therefore, splash from the vehicle 5, reflection of a headlight of a following vehicle from a road surface, a headlight of a vehicle running in an adjacent lane, and the like, which appear at a lower part of the image than the centroid position G of the region $R_0$ can be prevented from being included. Thereby, a brightness gradient g with high certainty can be calculated and therefore a high certainty diagnosis of the white turbid level U can be performed. Since the scanning direction is set only in a single direction, the brightness distribution can be generated in a short time to improve efficiency of the processings.

According to the white turbid state diagnostic apparatus 11 of an embodiment of the present invention, the scanning direction (line) to calculate the brightness gradient g is set so as to extend from the centroid position G of the region $R_0$ to the circumferential edge of the region $R_0$ and the horizontal position of the scanning start point O is set between the horizontal line passing the centroid position G of the region $R_0$ and the horizontal line passing the upmost position of the region $R_0$. Thereby, an image due to splash from the vehicle 5, reflection of a headlight of a following vehicle from a road surface, or a headlight of a vehicle running in an adjacent lane is barely included. Accordingly, an accurate brightness gradient g without any affection of these images can be calculated.

According to the white turbid state diagnostic apparatus 11 of an embodiment of the present invention, a plurality of scanning directions (lines) are set in combination. Thereby, even in case where unexpected noise occurs in a particular direction, influence from the noise can be reduced and the brightness gradient with high certainty can be calculated and thereby the white turbid level U with high certainty can be calculated.

According to the white turbid state diagnostic apparatus 11 of an embodiment of the present invention, the brightness gradient calculation part 32 corrects the brightness gradient g based on a gain value of the imaging part 10, which is adjusted by a gain adjustment part 16 to update the brightness gradient g. Therefore, more accurate brightness gradient g can be calculated and thus the white turbid level U can be more accurately diagnosed.

According to the white turbid state diagnostic apparatus 11 of an embodiment of the present invention, if the gain value of the imaging part 10, which is adjusted by the gain adjustment section 16 is less than a predetermined value K, the brightness gradient calculation part 32 corrects the brightness gradient g by being multiplied by a logarithm natural of the gain adjusted in the gain adjustment part 16 to generate a more accurate brightness gradient g. If the gain value adjusted by the gain adjustment section 16 is the predetermined value K or more, the brightness gradient calculation part 32 corrects the brightness gradient g by being multiplied by a logarithm natural of the predetermined value K to generate a more accurate brightness gradient g. Thereby, the white turbid level U can be more accurately diagnosed.

According to a white turbid state diagnostic apparatus of an embodiment of the present invention, a white turbid level of a lens due to grime is steadily detected and the white turbid level can be certainly diagnosed.

Although the preferred embodiments of the present invention have been described, the present invention is not limited thereto. Various changes and modifications can be made to the embodiments by those skilled in the art as long as such modifications and changes are within the scope of the present invention as defined by the claims.

What is claimed is:
1. A white turbid state diagnostic apparatus, comprising
an imager that is installed on a vehicle and observes a periphery of the vehicle via a lens, the imager having a photoelectric convertor that converts a light signal of the observed periphery of the vehicle into an image signal;
a region detector that detects a region from the image signal, the region being constituted by pixels having brightness values over a predetermined brightness and being in a substantially circular shape having a predetermined area or more;
a brightness gradient calculator that calculates a brightness gradient on a line which is directed from a predetermined position in a predetermined direction based on brightness values of pixels on the line in the region; and a white turbid level calculator that calculates a white turbid level of the lens based on the brightness gradient, wherein the white turbid level calculator includes:

a brightness gradient average value calculator that calculates an average value of the brightness gradient calculated on the line to obtain a white turbid level;

a similarity calculator that calculates a similarity of regions detected from image signals imaged at different timings; and a certainty determiner that determines a certainty of the white turbid level according to a period where high similarities are continuously calculated, wherein the certainty determiner updates the average value of the white turbid levels calculated in the previous processing and stores the updated average value, and wherein the certainty determiner calculates an error from the updated average value and the previous average value to determine a certainty of the white turbid level.

2. The lens white turbid state diagnostic apparatus according to claim 1, wherein the imager has a gain adjustor that adjusts a gain that converts the light signal into the image signal according to brightness of the periphery of the vehicle; and if the gain is larger than a predetermined value, the white turbid level calculator calculates the white turbid level.

3. The white turbid state diagnostic apparatus according to claim 1, wherein a starting point of the line has a horizontal position being at a horizontal position of a centroid of the region and a vertical position being at a position between a horizontal line passing the centroid position of the region and a horizontal line passing an upmost position of the region;

the line extends in a leftward or a rightward direction from the starting point in the image signal.

4. The white turbid state diagnostic apparatus according to claim 1, wherein the line extends from a centroid of the region to a circumferential edge of the region; and a starting point of the line has a vertical position which is between a horizontal line passing the centroid of the region and a horizontal line passing an upmost position of the region.

5. The white turbid state diagnostic apparatus according to claim 3, wherein the line is constituted by a plurality of lines in combination.

6. The white turbid state diagnostic apparatus according to claim 5, wherein the line is constituted by a plurality of lines having a bilaterally symmetric relationship with respect to a line passing the centroid position of the region and extending vertically in the image signal.

7. The white turbid state diagnostic apparatus according to claim 1, wherein the region is a region formed by a lighting headlight of another vehicle imaged by the imager.

8. The white turbid state diagnostic apparatus according to claim 7, wherein the another vehicle is a vehicle running in a same lane as the vehicle at a backward position.

9. The white turbid state diagnostic apparatus according to claim 1, wherein the brightness gradient is calculated as a number of pixels on the line between a position where the brightness value on the line goes down under a first threshold value to a position where the brightness value on the line goes down under a second threshold value which is less than the first threshold value in a direction extending from a starting point of the line set in the image signal along the line.

10. The white turbid state diagnostic apparatus according to claim 1, wherein the similarity calculator judges that the similarity is high when a ratio of an average value of a plurality of previous white turbid levels and the latest white turbid level is within a predetermined range.

11. The white turbid state diagnostic apparatus according to claim 2, wherein the brightness gradient calculator corrects the brightness gradient based on a gain adjusted by the gain adjustor.

12. The white turbid state diagnostic apparatus according to claim 11, wherein the brightness gradient calculator corrects the brightness gradient by being multiplied by a logarithmic nature of the gain adjusted by the gain adjustor when the gain adjusted by the gain adjustor is less than a predetermined gain, and corrects the brightness gradient by being multiplied by a logarithmic nature of the predetermined gain when the gain adjusted by the gain adjustor is the predetermined gain or more.

* * * * *